(12) United States Patent
Pelluru et al.

(10) Patent No.: US 12,450,895 B1
(45) Date of Patent: Oct. 21, 2025

(54) APPARATUS AND METHOD FOR FEEDBACK UTILIZATION IN AUTOMATED SCANNING SYSTEMS

(71) Applicant: Pramana, Inc., Cambridge, MA (US)

(72) Inventors: Pavani Pallavi Pelluru, Pocharam (IN); Raghubansh Bahadur Gupta, Bengaluru (IN); Viral Pandey, Cambridge, MA (US); Ramanjaneya Reddy, Bengaluru (IN); Sarvesh Kumar Thapa, Bengaluru (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/072,283

(22) Filed: Mar. 6, 2025

(51) Int. Cl.
*G06V 10/98* (2022.01)
*G06V 20/69* (2022.01)

(52) U.S. Cl.
CPC .......... *G06V 10/987* (2022.01); *G06V 20/693* (2022.01)

(58) Field of Classification Search
CPC ....... G06V 10/987; G06V 20/693; H04N 1/00
USPC .......................................................... 348/79
See application file for complete search history.

(56) References Cited

U.S. PATENT DOCUMENTS

| | | | |
|---|---|---|---|
| 11,978,191 B1* | 5/2024 | Gangirevula | G06T 7/0004 |
| 12,087,432 B1* | 9/2024 | Shiralkar | G06T 15/00 |
| 2005/0111757 A1 | 5/2005 | Brackett et al. | |
| 2016/0321809 A1 | 11/2016 | Chukka et al. | |
| 2021/0312620 A1 | 10/2021 | Zuo et al. | |
| 2024/0320823 A1* | 9/2024 | Shiralkar | G06T 11/00 |
| 2025/0132018 A1* | 4/2025 | Gangirevula | G06T 7/0012 |

FOREIGN PATENT DOCUMENTS

WO     2024233636 A2     11/2024

* cited by examiner

*Primary Examiner* — Sath V Perungavoor
*Assistant Examiner* — Kristin Dobbs
(74) *Attorney, Agent, or Firm* — Caldwell Intellectual Property Law

(57) ABSTRACT

An apparatus for feedback utilization in automated scanning systems, the apparatus including a scanning system and a computing device configured to extract a unique identifier from the slide label located on the at least a slide using the scanning system, retrieve a user input associated with the at least a slide, digitally map the user input to at least a corresponding region on the at least a slide generate at least one scanner command as a function of the transformed user input wherein the at least one scanner command is configured to command the scanning system to prioritize the transformed user input when rescanning the at least a slide and transmit the at least one scanner command to the scanning system to generate the at least a re-scanned image.

20 Claims, 10 Drawing Sheets

APPARATUS AND METHOD FOR FEEDBACK UTILIZATION IN AUTOMATED SCANNING SYSTEMS

FIELD OF THE INVENTION

The present invention generally relates to the field of scanning systems. In particular, the present invention is directed to an apparatus and method for feedback utilization in automated scanning systems.

BACKGROUND

Current systems for scanning slides often lack efficient mechanisms for identifying errors or inconsistencies in scanned images, making it challenging to initiate targeted rescanning operations. As a result, the scanning process may produce images with suboptimal quality in areas critical for diagnostic or analytical purposes. In addition, current systems lack the capabilities to ensure that feedback is properly transformed to accommodate changes in scanning systems or changes in the orientation of scanned images.

SUMMARY OF THE DISCLOSURE

In an aspect, an apparatus an apparatus for feedback utilization in automated scanning systems is described. The apparatus includes a scanning system. The scanning system is configured to initiate a rescanning operation for at least a slide including a slide label to generate at least a re-scanned image. The apparatus includes at least a processor, and a memory communicatively connected to the at least a processor. The memory contains instructions configuring the at least a processor to extract a unique identifier from the slide label located on the at least a slide, retrieve a user input associated with the at least a slide from a database as a function of the unique identifier, wherein the user input includes one or more corrective actions and digitally map the user input to at least a corresponding region on the at least a slide, wherein digital mapping the user input to the at least a corresponding region on the at least a slide includes receiving an initial scanned image of the at least a slide, identifying an initial orientation of the initial scanned image, identifying a subsequent orientation of the at least a slide, transforming the user input as a function of the initial orientation and the subsequent orientation to generate a transformed user input, wherein transforming the user input includes identifying an initial position of the user input on the initial scanned image and identifying a subsequent position of the user input on the slide as a function of the initial position, wherein the transformed user input includes the subsequent position of user input and mapping the transformed user input to the at least a corresponding region on the at least a slide. The processor is further configured to generate one or more scanner commands as a function of the transformed user input wherein the one or more scanner commands is configured to command the scanning system to prioritize the transformed user input when rescanning the at least a slide and transmit the scanner command to the scanning system to generate the at least a re-scanned image.

In another aspect, a method for feedback utilization in automated scanning systems is described. The method includes the step of extracting, by at least a processor, a unique identifier from a slide label located on at least a slide, retrieving, by at least a processor, a user input associated with the at least a slide from a database as a function of the unique identifier, wherein the user input includes one or more corrective actions and digitally mapping, by the at least a processor, the user input to at least a corresponding region on the at least a slide, wherein digital mapping the user input to the at least a corresponding region on the at least a slide includes receiving an initial scanned image of the at least a slide, identifying an initial orientation of the initial scanned image, identifying a subsequent orientation of the at least a slide, transforming the user input as a function of the initial orientation and the subsequent orientation to generate a transformed user input, wherein transforming the user input includes identifying an initial position of the user input on the initial scanned image and identifying a subsequent position of the user input on the slide as a function of the initial position, wherein the transformed user input includes the subsequent position of user input and mapping the transformed user input to the at least a corresponding region on the at least a slide. The method further includes generating, by the at least a processor, one or more scanner commands as a function of the transformed user input wherein the one or more scanner commands is configured to command the scanning system to prioritize the transformed user input when rescanning the at least a slide and transmitting, by the at least a processor, the scanner command to a scanning system to generate at least a re-scanned image of the at least a slide.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for rescan workflow management in automated scanning systems. The apparatus includes a scanning system configured to initiate rescanning for at least a slide containing a slide label in order to generate a re-scanned slide image. The apparatus is configured to identify a slide label on the slide, identifying a unique identifier on the slide label, retrieve an initial slide image and transform the user input and generate scanner commands using the transformed used input. Exemplary embodiments illustrating aspects of the present disclosure are described below in the context of several specific examples.

Figure 1:
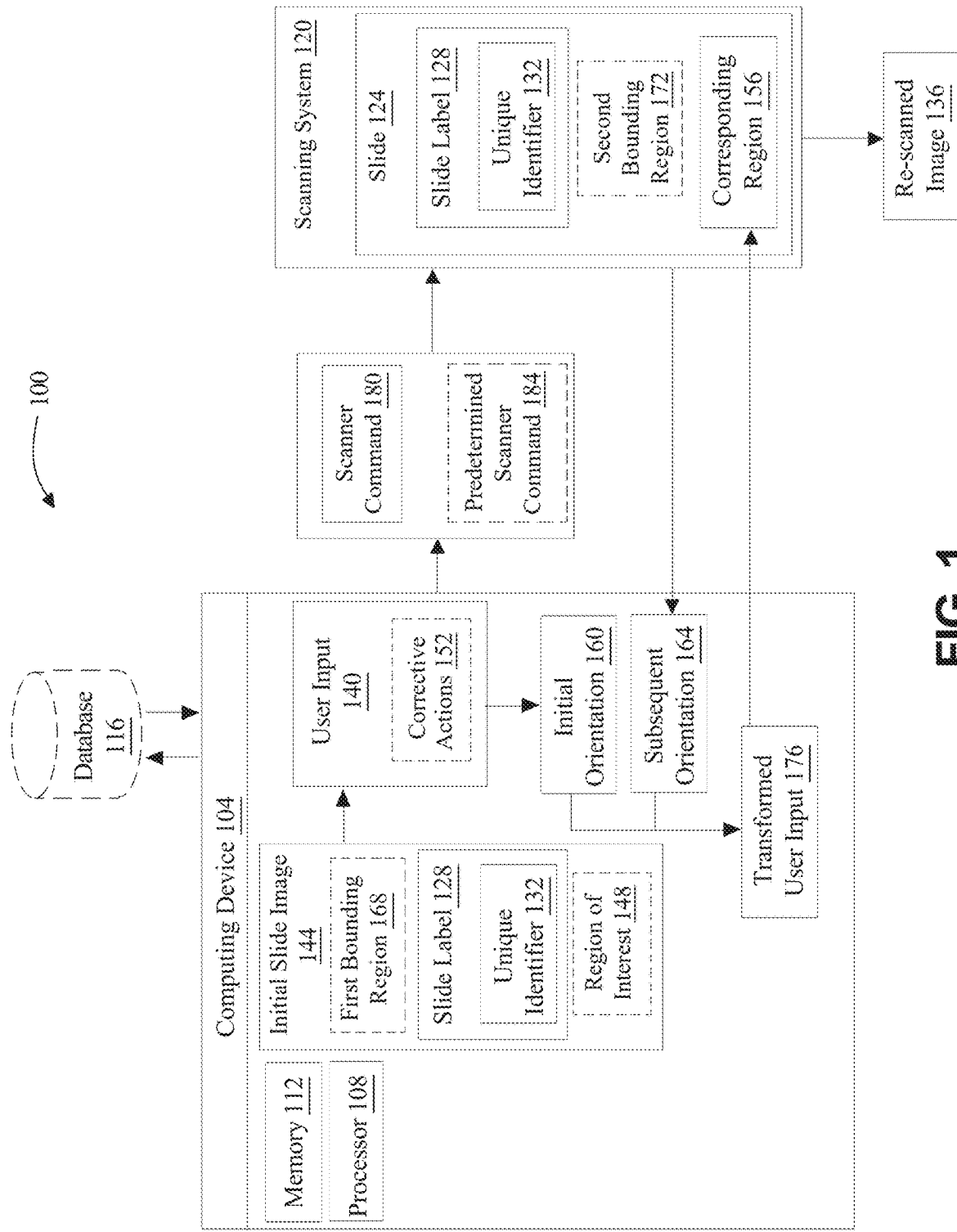
FIG. 1 illustrates a block diagram of an exemplary apparatus for rescan workflow management in automated scanning systems.

Referring now to FIG. 1, an exemplary embodiment of an apparatus 100 for feedback utilization in automated scanning system 120 is described. In one or more embodiments, apparatus 100 include a processor 108 and a memory communicatively connected to at least a processor 108. In one or more embodiments, processor 108 and/or memory may include any processor 108 and/or memory as described in this disclosure such as in reference to at least FIG. 2. In one or more embodiments, processor 108 and/or memory may be included in a computing device 104, such as any computing device 104 as described in this disclosure. In one or more embodiments, apparatus 100 may include any computing elements, hardware elements, sensors and/or the like as described in this disclosure. In one or more embodiments, apparatus 100 include and/or be included an apparatus 200 as described relative to at least FIG. 2. In one or more embodiments, apparatus may be communicatively connected to any databases 116, systems, graphical user interfaces and/or the like as described in this disclosure. In one or more embodiments, apparatus 100 may perform any processes, steps and/or actions described in at least FIG. 2. In one or more embodiments, apparatus 100 may be consistent with apparatus 200.

With continued reference to FIG. 1, apparatus includes a scanning system 120. In one or more embodiments, scanning system 120 includes any scanning system 120 as described in this disclosure. In one or more embodiments, scanning system 120 may include any scanning system 120 as described in reference to at least FIG. 2. In one or more embodiments, scanning system 120 may be consistent with scanning system 120 as described in reference to at least FIG. 2. In one or more embodiments, scanning system 120 may be configured to perform a scanning operation for at least a slide 124. In one or more embodiments, slide 124 may include any slide 124 as described in this disclosure. In one or more embodiments, slide 124 may include any slides 124 as described in reference to at least FIG. 2. In one or more embodiments, slide 124 may include a slide label 128. A "slide label" as described in this disclosure is a marking on a slide 124 that provides identifying information about a specimen contained within the slide 124. For example and without limitation, slide label 128 may include a name or type of the specimen, the stating method used, the data of preparation and/or the like. In one or more embodiments, slide label 128 may provide identifying information for slide 124. In one or more embodiments, slide label 128 may be located in a visible section of slide 124. In one or more embodiments, slide label 128 includes a unique identifier 132. In one or more embodiments, unique identifier 132 includes any unique identifier 132 as described in this disclosure. In one or more embodiments, unique identifier 132 may be used to catalog slide 124. In one or more embodiments, unique identifier 132 may be used to distinguish between two slides 124. In one or more embodiments, unique identifier 132 may be used to locate images of slide 124 within a storage or database 116, such as for example slid database 116 as described in reference to at least FIG. 2. In one or more embodiments, unique identifier 132 may include a barcode, A QR code, an alphanumeric sequence and/or any other information that may be used to distinguish between two slides 124. In one or more embodiments, unique identifier 132 may be used to store information about slide 124 on database 116, such as any database 116 as described in this disclosure. In one or more embodiments, slide label 128 may be scanned in order to retrieve unique identifier 132. In one or more embodiments, database 116 may include information associated with slide 124, wherein such information may be indexed using unique identifier 132. In one or more embodiments, processor 108 and/or individual may retrieve information pertaining to slide 124 and/or a specimen within slide 124 by inputting unique identifier 132 into database 116 and/or a data storage. In one or more embodiments, slide label 128 may include paper or plastic that is adhered to slide 124. In one or more embodiments, slide label 128 may be placed at or near an end of slide 124 such that a viewing area of slide 124 remains clear. In one or more embodiments, slide label 128 may include a rectangular piece of paper, plastic and/or any other material that is adhered to slide 124 and used to identify information pertaining to slide 124.

With continued reference to FIG. 1, scanning system 120 is configured to generate a re-scanned image 136. A "re-scanned image" for the purposes of this disclosure refers to a second or subsequent image capture of a slide 124. In one or more embodiments, scanned image may include an initial capture of a slide 124, wherein re-scanned image 136 may include a second and/or subsequent capture of slide 124. In one or more embodiments, scanning system 120 may be configured to capture re-scanned image 136 in order to replace scanned image. In one or more embodiments, scanned image may include a scanned image as described in reference to at least FIG. 2. In one or more embodiments, re-scanned image 136 may replace scanned image in instances in which scanned image was captured improperly. For example and without limitation, scanned image may be out of focus and/or not capture a specimen on slide 124 properly. In one or more embodiments, re-scanned image 136 may be generated from a rescan as described in reference to at least FIG. 2. In one or more embodiments, scanning system 120 and/or apparatus 100 may be configured to capture a subsequent image of slide 124 which may be referred to as re-scanned image 136. In one or more embodiments, scanned image may be captured by a first scanning system 120 and re-scanned image 136 may be captured by a second and differing scanning system 120. In one or more embodiments, re-scanned image 136 may be captured in any way described in reference to scanned image in at least FIG. 2.

With continued reference to FIG. 1, processor 108 is configured to extract unique identifier 132 from slide label 128 on slide 124. In one or more embodiments, unique identifier 132 may be located on slide 124. In one or more embodiments, processor 108 may extract unique identifier 132 in anyway as described in this disclosure. In one or more embodiments, unique identifier 132 may be extracting using scanning system 120, a barcode scanner, through user input 140 and/or the like. In one or more embodiments, unique identifier 132 may be received by processor 108 through any input device as described in this disclosure. In one or more embodiments, a plurality of slides 124 may be configured for scanning, wherein processor 108 may be configured to extract unique identifier 132 from each slide 124 prior to scanning.

With continued reference to FIG. 1, processor 108 is configured to retrieve a user input 140 associated with the at least a slide 124 from database 116. In one or more embodiments, user input 140 may include any user input 140 as described in this disclosure. In one or more embodiments, user input 140 may be generated by a user during generation of scanned image. In one or more embodiments, user input 140 may be generated during generation of an initial scanned image 144. An "initial scanned image" for the purposes of this disclosure refers to an image of slide 124 captured prior to the generation of re-scanned image 136. In one or more embodiments, initial scanned image 144 may include scanned image captured during a previous scan, during a previous iteration of a processing of status, during a previous day, month, year and/or the like. In one or more embodiments, initial scanned image 144 may be consistent with scanned image as described in reference to at least FIG. 2. In one or more embodiments, the initial scanned image 144 of the at least a slide 124 includes a previously captured image of the at least a slide 124. In one or more embodiments, the initial scanned image 144 is received from the database 116. In one or more embodiments, upon capture of scanned image and/or initial scanned image 144, a user input 140 may be provided (as described in further detail below). In one or more embodiments, user input 140 may be stored within a local storage and/or database 116 for use in the generation of re-scanned image 136. In one or more embodiments, user input 140 may include quality errors associated with initial scanned image 144. In one or more embodiments, user input 140 may include parameters that require adjustment during a subsequent capture of slide 124 in order to properly capture a specimen within slide 124. In one or more embodiments, user input 140 may include annotations indicating the region of focus for scanning system 120. In one or more embodiments, user input 140 may include a bounding box such as any bounding box as described in this disclosure. In one or more embodiments, bounding box may be used to focus scanning system 120 on an area/perimeter defined by bounding box. In one or more embodiments, bounding box may indicate to processor 108 a particular region of interest 148 on slide 124. In one or more embodiments, bounding box may indicate to processor 108 to configure scanning system 120 to focus on a particular portion of slide 124. In one or more embodiments, bounding box may indicate to processor 108 that an area defined by a perimeter of bounding box should be of focus when generating re-scanned image 136. In one or more embodiments, bounding box may be used to indicate processor 108 to ignore a particular region of interest 148 on slide 124. In one or more embodiments, user input 140 may be generated and/or received following generation of initial scanned image 144 and stored on database 116. In one or more embodiments, prior to generation of re-scanned image 136, processor 108 may be configured to retrieve user input 140. In one or more embodiments, user input 140 may include corrective actions 152 that need to be taken during the capturing and/or generation of re-scanned image 136. In one or more embodiments, corrective actions 152 may include reducing scanning area, increasing scanning area, changing the focus of scanning system 120, increasing a stack size for a slide 124 that is marked for rescan, and/or the like as described in this disclosure. In one or more embodiments, user input 140 may include corrective actions 152 associated with initial scanned image 144. In one or more embodiments, corrective action may include removing and/or identifying inclusions or obstructions within initial scanned image. In one or more embodiments, inclusions and/or instructions may include the presence of hair, light glare and/or the like. In one or more embodiments, corrective actions 152 may be used to ensure proper capture of at least a slide 124 in re-scanned image 136. In one or more embodiments, one or more corrective actions 152 includes a focus error. In one or more embodiments, corrective action 152 includes correction of a focus error.

With continued reference to FIG. 1, user input 140 may include coordinates associated with corrective actions 152. In one or more embodiments, scanned image and/or initial scanned image 144 may include a two dimensional image. In one or more embodiments, corrective actions 152 may include coordinates within a two-dimensional coordinate system that locate and/or pinpoint corrective actions 152 on the two-dimensional image. In one or more embodiments, processor 108 may be configured to generate a coordinate system within the two dimensional image, wherein corrective actions 152 may be mapped and/or localized within the coordinate system. In one or more embodiments, a location of corrective actions 152 may be specified using X and Y coordinates relative to the two dimensional image. In one or more embodiments, a coordinate system may allow for processor 108 to identify a particular portion of image. In one or more embodiments, processor 108 may be configured to identify an origin (0,0) at a border of initial scanned image 144 following receipt of user data. In one or more embodiments, the origin may be located at or near a border of scanned image. In one or more embodiments, processor 108 may be configured to define an X axis as the horizontal axis across scanned image. In one or more embodiments, processor 108 may be configured to define the Y axis as the vertical axis along scanned image. In one or more embodiments, processor 108 may be configured to set a coordinate system scale. In one or more embodiments, each pixel of scanned image within coordinate system scale may represent a unit along the X or Y axis. In one or more embodiments, each pixel or set of pixels may be associated with a singular unit within the coordinate system. In one or more embodiments, corrective actions 152, annotations and/or the like may be located based on their relative positions within scanned image. In one or more embodiments, processor 108 may generate coordinates for each corrective action 152 and/or user input 140 relative to scanned image.

With continued reference to FIG. 1, processor 108 is configured to digitally map the user input 140 to at least a corresponding region 156 on the at least a slide 124. In one or more embodiments, corresponding region 156 may include an area on a physical slide 124 that aligns with or is associated with a region of interest 148 in scanned image. In one or more embodiments, corresponding region 156 may represent a physical counterpart of region of interest 148 and may allow for analysis. In one or more embodiments, processor 108 may be configured to digitally map user input 140 wherein user input 140 may be mapped onto slide 124 relative to scanned image. In one or more embodiments, digitally mapping user input 140 onto at least a corresponding region 156 of slide 124 may include identifying a location of user input 140 relative to slide 124. In one or more embodiments, scanned image may include a capture image of slide 124. In one or more embodiments digitally mapping user input 140 may include identifying a location user input 140 relative to slide 124. For example, and without limitation, user input 140 may be located near an edge of a specimen within scanned image, wherein digitally mapping may include identifying the corresponding location on slide 124 in which user input 140 would be located near the same edge of specimen. In one or more embodiments, processor 108 may be configured to digitally map user input 140 to corresponding region 156 in order to identify user input 140 relative to slide 124 rather than scanned image. In one or more embodiments, slide 124 may be oriented in a differing angle and/or direction from when initial scanned image 144 was captured wherein directly mapping user input 140 onto slide 124 may result in inaccuracies. In one or more embodiments, user input 140 may be located on a digital image of slide 124. In one or more embodiments, digital mapping user input 140 may include identifying the same relative position on physical slide 124 to that of digital image of slide 124. In one or more embodiments, processor 108 may be configured to digitally map user input 140 in any way as described in this disclosure.

With continued reference to FIG. 1, processor 108 may be configured to digitally map user input 140 by receiving initial scanned image 144 of slide 124. In one or more embodiments, initial scanned image 144 may be located on database 116 and/or within a local storage device. In one or more embodiments, initial scanned image 144 may be retrieved using unique identifier 132. In one or more embodiments, processor 108 may be configured to identify an initial orientation 160 of initial scanned image 144. An "initial orientation" for the purposes of this disclosure refers to location and orientation of slide 124 within initial scanned image 144. In one or more embodiments, processor 108 may use machine vision system as described in reference to at least FIG. 2, in order to identify slide 124 within initial scanned image 144. In one or more embodiments, processor 108 may identify edges, boundaries and/or the like of slide 124 within initial scanned image 144 in order to locate initial scanned image 144. In one or more embodiments, initial orientation 160 may include a change in angular rotation, a change in distance and/or the like. In one or more embodiments, initial orientation 160 may be set as the reference, wherein initial orientation 160 may be zero. In one or more embodiments, initial orientation 160 may be determined relative to an external reference system set by processor 108. In one or more embodiments, processor 108 may use machine vision system in order to identify initial orientation 160 of slide 124 within initial scanned image 144. In one or more embodiments, processor 108 may identify slide 124 by identifying slide label 128 and/or unique identifier 132. In one or more embodiments, processor 108 may be configured to identify slide label 128 and/or unique identifier 132 using machine vision system. In one or more embodiments, machine vision system may be configured to identify slide label 128, edges of slide label 128 and/or the like. In one or more embodiments, processor 108 machine configured to identify an orientation of slide label 128. In one or more embodiments, slide label 128 may remain fixed relative to slide 124. In one or more embodiments, identifying an initial orientation 160 of the initial scanned image 144 includes identifying the slide label 128 within the initial scanned image 144 and identifying an orientation of the slide label 128 within the initial scanned image 144. In one or more embodiments, the orientation of slide label 128 may be used as a reference point, such that the orientation may be determined to be zero. In one or more embodiments, orientation of slide label 128 may be determined relative to another reference point selected by processor 108.

In one or more embodiments, identifying initial orientation 160 may include identifying slide label 128, edges of slide label 128 and/or the like. In one or more embodiments, identifying initial orientation 160 may include identifying a physical element on slide 124 that may remain fixed relative to slide 124. For example, and without limitation, specimen may remain fixed relative to slide 124 such that specimen may not move or rotate relative to slide 124.

In one or more embodiments, identifying initial orientation 160 may include using an image classifier. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device 104 and/or another device may generate image classifier using a classification algorithm, defined as a process whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In some cases, processor 108 may use an image classifier to identify a key image in data described in any data described in this disclosure. As used herein, a "key image" is an element of visual data used to identify and/or match elements to each other. For example, without limitation key image may include slide label 128 and/or unique identifier 132. An image classifier may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive input data (e.g. initial scanned image 144) described in this disclosure and output a key image within the data, such as slide label 128. In some cases, image classifier may identify one or more components within an image. In one or more embodiments, the image may depict a specimen and/or a slide 124. In some cases, image classifier may identify borders of slide 124 image, specimen within slide 124 image, slide labels 128 and/or the like.

With continued reference to FIG. 1, identifying initial orientation 160 may include identifying an initial bounding region. A "bounding region" for the purposes of this disclosure refers to the perimeter of slide 124. In one or more embodiments, processor 108 may be configured to identify bounding region of slide 124 within initial scanned image 144. In one or more embodiments, bounding region within initial scanned image 144 may be referred to as a first bounding region 168. In one or more embodiments, first bounding region 168 may include an identified perimeter of slide 124 within initial scanned image 144. In one or more embodiments, identifying bounding region may allow for processor 108 to determine the location of user input 140 relative to perimeter of slide 124. In one or more embodiments, identifying bounding region may ensure that user input 140 is properly digitally mapped within a perimeter of slide 124. In one or more embodiments, processor 108 may be configured to localize user input 140 relative to first bounding region 168. As described in this describe a process of "localizing" to a process of determining or refining the exact position of an object or element of within a given reference frame or coordinate system. A "coordinate system" for the purposes of this disclosure refers to a system that users numbers or coordinates to specify a position within a space. In one or more embodiments, coordinate system may include a cartesian coordinate system having perpendicular axes (X, Y in 2D and X, Y, Z, in 3d). In one or more embodiments, cartesian coordinate system may be used to graph and/or pinpoint objects within a perpendicular axis. In one or more embodiments, pixel amounts may be used as the basis for each axis, wherein for example, a set of one or more pixels may equate to a singular unit within an X, Y or Z axis. In one or more embodiments, processor may use pixels within an image as the basis for a cartesian coordinate system, wherein each pixel may be representative of a unit along an X, Y, or Z axis. In one or more embodiments, coordinate system may further includes a cylindrical coordinate system, a spherical coordinate system, a geographic coordinate system and/or the like. In one or more embodiments, coordinates within a coordinate system may be recorded and/or received in the form of matrices. For example, and without limitation, a distance of 5 along an x axis and a distance of 6 along y axis may be recorded as "[5,6]". In one or more embodiments, coordinates may be recorded as matrices, wherein one or more matrix transformations processes may be performed on the matrices.

With continued reference to FIG. 1, in one or more embodiments, coordinate system may include polar coordinates. In one or more embodiments, polar coordinates may include coordinates represent a point in a plane using a distance and an angle rather than Cartesian (rectangular) coordinates (x,y) A point in polar coordinates may be written as: (r,θ), wherein r is the radial coordinate and θ is the angular coordinate. In one or more embodiments, coordinate system may include a 3D system using Voxels. In one or more embodiments, coordinate system may include a 3D voxel occupancy representation (VOR). For the purposes of this disclosure, a "3D voxel occupancy representation (VOR)" is a 3D digital representation of an object, wherein the representation is composed of a plurality of discrete volumetric elements known as voxels. For the purposes of this disclosure, a "voxel" is a 3D equivalent of a pixel in 2D imaging. While a pixel represents a point in a 2D image and may include properties such as color and/or brightness, a voxel may represent a volume in a 3D space and may include additional properties such density and/or occupancy as described below. In one or more embodiments, each voxel of plurality of voxels within 3D VOR may represent a specific portion of a mechanical part. In some cases, each voxel may be the smallest distinguishable box-shaped part (i.e., 1 px×1 px×1 px) of a 3D object or model. In some cases, each voxel of plurality of voxels within VOR may be represented as a cube or rectangular prism (although other shapes may be used in specialized applications). Each voxel may include a size that determines the resolution of a 3D object or model. In one or more embodiments, smaller voxels may provide higher resolution; however, it may require more computational resources (e.g., RAM) for processor to process.

With continued reference to FIG. 1, in one or more embodiments, each voxel of plurality of voxels within VOR may include one or more embedded values. For the purposes of this disclosure, "embedded values" are specific numerical or categorical data associated with each voxel. In some cases, embedded values may represent various attributes or characteristics of the corresponding portion of 3D object or 3D model that voxel represents. In a nonlimiting example, embedded values may include density values, mechanical properties, texture information, or any other quantitative measures that provide insights into the underlying structure of 3D object or 3D model. As a nonlimiting example, such embedded values may be derived or extracted from initial slide image, slide label and/or the like, as described above. In some cases, embedded values may be utilized, by processor, to differentiate between different components within a complex structure such as a mechanical part.

With continued reference to FIG. 1, in one or more embodiments, each voxel of plurality of voxels may include a presence indicator. For the purposes of this disclosure, a "presence indicator" is a data element that indicates a presence or absence (i.e., occupancy) of material within that portion of 3D object or model. In some cases, and without limitation, presence indicator may include an occupancy status as one of the embedded values described herein. Portion may include a specific location within 3D space where 3D data structure is generated; for instance, and without limitation, a coordinate in 3D space may be represented in a tuple such as (x, y, z). In one or more embodiments, 3D VOR may provide a spatial framework that allows for the modeling and visualization of internal structures in 3D space. In some cases, 3D data structure may include a plurality of layers or slices (either horizontal, e.g., xy plane, or vertical, e.g., xz or yz plane, depending on the view direction), wherein each layer or slices of the plurality of layers or slices is corresponding to a different cross-sectional view of 3D object or 3D model, and collectively forming a comprehensive 3D depiction of the 3D object or 3D model. In a nonlimiting example, 3D VOR having plurality of voxels with presence indicators may indicate whether each voxel in 3D space may be occupied by one or more materials. A binary value such as 0 or 1 may be configured as presence indicator to show whether a voxel of 3D space is occupied (e.g., 1) or empty (e.g., 0). In should be noted that other values may be used as presence indicator such as a Boolean value, e.g., TRUE vs. FALSE.

With continued reference to FIG. 1, in one or more embodiments, one or more embedded values, such as, and without limitation, occupancy, density, type of material or materials, or the like, may be derived from set of images described herein by processor. In a nonlimiting example, determining occupancy status of each voxel of plurality of voxels may include converting set of images to a set of binary images and determining occupancy status of each voxel as a function of the structure of interest's binary value.

With continued reference to FIG. 1, in one or more embodiments, generating 3D data structure of 3D object or model may include generating a 3D array. In some cases, processor may divide 3D space into a grid of plurality of voxels, each with specific x, y, and z coordinates as embedded values. Each element of 3D array may correspond to a voxel. In some cases, 3D array may allow for easy access and manipulation of plurality of voxels, enabling various analyses, visualizations, and transformations either described or not described in this disclosure.

With continued reference to FIG. 1, alternatively and/or additionally, 3D data structure may include a 3D grid configured to map presence indicators and/or other embedded values described herein of plurality of voxels. As used in this disclosure, a "3D grid" is a 3D data structure that divides a given volume (e.g., volume of a heart) into a plurality of discrete units called cells (i.e., volume elements). In one or more embodiments, each cell within 3D grid may be associated with a distinct voxel. Mapping presence indicators or other embedded values may include assigning each presence indicator or embedded value to each point within 3D grid such as corners of each corresponding cell.

With continued reference to FIG. 1, in one or more embodiments, cells may be continuous, meaning that one or more cells may represent one or more continuous regions of space rather than discrete, separate units. As a nonlimiting example, instead of being uniform, mapped presence indicator and/or other embedded values may vary continuously, through one or more gradients, across different cells or cell's volume. In such case, processor may use interpolation to estimate other (unknown) embedded values within a range based on existing values such as known embedded values at specific points, thereby allowing for smooth transitions between cells. Exemplary interpolation methods may include, without limitation, linear interpolation, cubic interpolation, and/or the like. For example, and without limitation, if the corners of a cell have known values, interpolation can be used to estimate the values at any point within the cell based on those corner values.

With continued reference to FIG. 1, in one or more embodiments, 3D data structure may include a 3D grid having a plurality of cells, e.g., voxels, wherein each cell may contain a continuous range of embedded values. Processor may be configured to apply trilinear or tricubic interpolation to estimate one or more embedded values within each cell based on presence indicator or other known values at the cell's boundaries; Such 3D grid may provide a smooth, continuous representation of internal structures regarding a 3D object or 3D model, allowing for more nuanced analysis and visualization.

With continued reference to FIG. 1, in some cases, presence indicators and/or other embedded values may be mapped to 3D grid as a function of array masking, wherein specific array or grid may be selected to modify based on one or more predefined criteria. In a nonlimiting example, processor may generate a mask e.g., a binary array that defines which voxels or cells are affected. Mask may be used to select or modify specific voxels or cells based on certain attributes; for instance, and without limitation, processor may use mask to isolate a portion within 3D object or 3D model and focus the analysis on that specific region. Such mask may include one or more criteria defined by specific density thresholds that separate one subset of structures or voxels from another subset of structures or voxels. In some cases, such mask may further include a binary mask, wherein each voxel in the 3D grid may be assigned a first presence indicator, such as 1, if the voxel meets certain criteria, and a second presence indicator, such as 0, if it does not. In one or more embodiments, mask may be directly applied to 3D grid by selecting or modifying voxels or cells, thereby enabling processor to highlight, exclude, or otherwise manipulate specific parts within 3D grid. Processor may then perform an element-wise multiplication between 3D grid and the mask.

With continued reference to FIG. 1, in one or more embodiments, user input 140 may be localized relative to first bounding region 168 wherein a position of user input 140 may be determined relative to first bounding region 168. In one or more embodiments, processor 108 may identify first bounding region 168 within initial scanned image 144 and subsequently identify user input 140. In one or more embodiments, user input 140 may be localized relative to bounding region, wherein processor 108 may digitally map user input 140 onto slide 124 by determining a distance of user input 140 from a perimeter of slide 124. In one or more embodiments, processor 108 may use a coordinate system in order to identify a location of user input 140 relative to first bounding region 168. In one or more embodiments, an edge or portion of bounding region may be used as a reference point, wherein user input 140 may be located relative to the reference point. In one or more embodiments, bounding region may include a rectangular shape and/or a substantially rectangular shape, wherein user input 140 may be mapped and/or positioned relative to multiple corners within the bounding region. In one or more embodiments, identifying a position of user input 140 relative to multiple corners and/or points within first bounding region 168 may increase the accuracy and placement of digitally mapping user input 140.

With continued reference to FIG. 1, bounding region may define the bounds of the coordinate system within initial scanned image 144 and/or slide 124. For example and without limitation a first edge may indicate the a first horizontal bound and a second edge may indicate a second horizontal bound, wherein the horizontal bounds of the coordinate system are defined by the first edge and the second edge. Similarly, the vertical bounds of the coordinate system may be determined by identifying edges of the first bounding region 168. In one or more embodiments, processor 108 may be configured to identify a distance of the horizontal bounds and/or vertical bounds using pixels and/or any other units.

With continued reference to FIG. 1, processor 108 is configured to identify a subsequent orientation 164 of slide 124. A "Subsequent orientation" for the purposes of this disclosure refers to an identified orientation of slide 124 prior to generation of re-scanned image 136. for example, and without limitation, during a first scan, initial scanned image 144 may be generated wherein initial orientation 160 may be determined. Continuing, prior to a subsequent scan, slide 124 may be placed under scanning system 120 and a subsequent orientation 164 may be determined. In one or more embodiments, subsequent orientation 164 may be determined using machine vision system as described in this disclosure. In one or more embodiments, processor 108 may be configured to capture an image of slide 124 in order to identify a subsequent orientation 164 of slide 124. In one or more embodiments, subsequent orientation 164 may be determined in any way similar to that of initial orientation 160. In one or more embodiments, processor 108 may be configured to identify an orientation of slide 124 by identifying slide label 128 and/or unique identifier 132. In one or more embodiments, processor 108 may be configured to identify slide label 128 and/or a perimeter thereof. In one or more embodiments, processor 108 may be configured to identify a second bounding region 172 of slide 124. In one or more embodiments, second bounding region may refer to an identified bounding region of slide 124 prior to generation of re-scanned image 136. In one or more embodiments, second bounding region 172 may be identified similar to that of first bounding region 168. In one or more embodiments, processor 108 may be configured to identify second bounding region 172 of slide 124, wherein processor 108 may identify a border of slide 124. In one or more embodiments, processor 108 may capture an image and/or a temporary image of slide 124 in order to identify bounding region.

With continued reference to FIG. 1, in one or more embodiments, initial orientation 160 and/or subsequent orientation 164 may be captured as distances from borders, locations within a two-dimensional grid, as matrices and/or the like. In one or more embodiments, locations and/or positions within initial orientation 160 and/or subsequent orientation 164 may be recorded relative to a reference frame. In one or more embodiments, elements within initial orientation 160, such as slide label 128, unique identifiers 132, bounding regions and/or the like may be designated as reference points relative to initial orientation 160 and subsequent orientation 164. In one or more embodiments, processor 108 may compare initial orientation 160 and subsequent orientation 164 in order to determine a change in angular rotation of slide 124, a change in positioning of slide 124 and/or the like. In one or more embodiments, processor 108 may determine a change in the position of slide label 128 between initial scanned image 144 and slide 124, wherein such change may indicate that slide 124 is currently oriented and/or placed a particular degree or distance relative to initial scanned image 144. In one or more embodiments, initial orientation 160 and subsequent orientation 164 may be recorded as matrices wherein one or more matrix transformation processes may allow for processor 108 to identify a change between initial orientation 160 and subsequent orientation 164. In one or more embodiments, initial orientation 160 and subsequent orientation 164 may include corners of first bounding region 168 and second bounding region 172 respectfully as matrices. In one or more embodiments, processor 108 may identify a change in an orientation of slide 124 as a function of a change in the matrices. In one or more embodiments, processor 108 may identify a border of slide label 128 and/or various end points of slide label 128 wherein changes between initial orientation 160 and subsequent orientation 164 may be used to identify changes between initial scanned image 144 and slide 124. In one or more embodiments, processor 108 may use a transformation matrix to identify changes between initial scanned image 144 and slide 124. In one or more embodiments, processor 108 may use one or more linear transformation and/or matrix transformation processes in order to identify changes between initial orientation 160 and subsequent orientation 164.

With continued reference to FIG. 1, processor 108 is configured to transform user input 140 as a function of initial orientation 160 and subsequent orientation 164 to generate a transformed user input 176. A "transformed user input" for the purposes of this disclosure refers to a user input 140 which has been modified such that positions within a scanned image that are identified by the user input 140 account for changes between initial orientation 160 and subsequent orientation 164. For example, without limitation in instances in which a comparison of initial orientation 160 and subsequent orientation 164 indicate a change of 3 degrees, positions within user input 140 may be adjusted 3 degrees as well. In one or more embodiments, transformed user input 176 may include modified coordinates of user input 140, such that the user input 140 may be properly mapped onto slide 124. In one or more embodiments, transformed user input 176 may ensure that user input 140 is mapped correctly relative to slide 124. In one or more embodiments, transformed user input 176 may account for changes in the orientation of slide 124 relative to initial scanned image 144. In one or more embodiments, processor 108 may utilize a transformation matrix in order to generate transformed user input 176. A "transformation matrix," for the purpose of this disclosure, is a mathematical tool used to perform transformations on objects in a coordinate system. In one or more embodiments, transformation matrix may include a translation matrix wherein objects are moved from one location to another without altering a shape or orientation. In one or more embodiments, transformation matrix may include a scaling matrix wherein the size of an object (i.e. bounding box) may be changed relative to another coordinate system (i.e. slide). In one or more embodiments, transformation matrix may include a rotation matrix wherein an object is rotated about an origin or specified axis. In one or more embodiments, transformation matrix may include a shear matrix wherein an object is skewed along one or both axis. In one or more embodiments, transformation matrix may include a reflection matrix wherein objects are mirror about an axis. In one or more embodiments, matrixes within a coordinate system may be recorded as a 3×3 matrix, wherein transformation matrix may be used to convert points within the matrix relative to another coordinate system. It may include operations such as, without limitation, rotation, scaling, shearing, and translation (moving the whole object without changing its shape or orientation). In a non-limiting example, the transformation matrix may be used to map user input 140 into an oriented coordinate system such as that of slide 124. Processor 108 may apply a linear transformation to coordinates within user input 140, wherein the application of the linear transformation may effectively change the coordinate system from one relative to initial scanned image 144 to one relative to slide 124. In one or more embodiments, transformed user input 176 may be used to properly identify and address corrective actions 152 prior to generation of re-scanned image 136. In one or more embodiments, transformation of user input 140 may ensure that the position of user inputs 140 relative to slide label 128 and/or bounding regions remain the same. In one or more embodiments, both user input 140 and transformed user input 176 contain the same positions relative to bounding regions and/or slide labels 128. In one or more embodiments, user inputs 140 may be transformed in order to accurately reflect their positions relative to an image that is sought to be capture (i.e. re-scanned image 136). In one or more embodiments, the user input 140 as a function of the initial orientation 160 and the subsequent orientation 164 to generate a transformed user input 176 includes performing a matrix transformation on the user input 140 as a function of the initial orientation 160 and the subsequent orientation 164.

With continued reference to FIG. 1, it may be the case that initial slide 124 image includes a zoomed out or zoomed in image of slide 124. In one or more embodiments, processor 108 may use identified horizontal and/or vertical bounds of first bounding region 168 and/or second bounding region 172 in order to apply a scaling factor. For example, and without limitation, a horizontal distance of a first bounding region 168 may be calculated to be 1000 pixels, whereas a horizontal distance of second bounding region 172 may be calculated to be 2000 pixels. As a result, processor 108 may have to apply a scaling factor 1:2 in order to accommodate for the relative position of user input 140 within second bounding region 172.

With continued reference to FIG. 1, in one or more embodiments, processor 108 may identify a position of user inputs 140 relative to first bounding region 168 and/or slide label 128. For example, and without limitation, processor 108 may identify a position of a particular user input 140 as being located 5 units horizontally and 5 units vertically from first bounding region 168 and/or slide label 128. In one or more embodiments, identifying a position of user inputs may include identifying positional coordinates of user inputs and/or corrective actions. In one or more embodiments, a position of user inputs within initial slide image may be referred to as "initial position". In one or more embodiments, generating and/or identifying a transformed user input include identifying a position of user input within slide 112 and/or a subsequent image. In one or more embodiments, identifying and/or generating transformed user input may include identifying positional coordinates of user input relative to slide 112 and/or a subsequent slide image. In one or more embodiments, a position, and/or positional coordinates of user inputs relative to slide 112 and/or subsequent slide image may be referred to as "subsequent positions". In one or more embodiments, transforming the user input as a function of the initial orientation and the subsequent orientation to generate a transformed user input includes identifying an initial position of the user input on the initial scanned image and identifying a subsequent position of the user input on the slide as a function of the initial position, wherein the transformed user input includes the subsequent position of user inputs. As used in this disclosure, an "initial position" of a user input is an initial position of a region, set of pixels, or other portion of an image that has been identified by the user input; as used in this disclosure, a "subsequent position" of a user input is position of a region, set of pixels, or other portion of an image that has been identified by the user input, as moved and/or transformed to a new position, orientation, or the like. In one or more embodiments, user input 140 may include positional coordinates within a reference frame identified by processor. A "positional coordinate" for the purposes of this disclosure refers to location of a given point of set of points in a given space. For example, and without limitation, positional coordinates may include "[2,4]" wherein such values may indicate the location of user input relative to a given reference point. In one or more embodiments, the positional coordinates identify a position of user input within a cartesian coordinate system. In one or more embodiments, the positional coordinates may include X and Y coordinates within a reference frame defined by initial scanned image. In one or more embodiments, user inputs may be digitally mapped as described in reference at least FIG. 2, wherein user inputs may be mapped onto a coordinate system generated in reference to initial scanned image. In one or more embodiments, user inputs may include positional coordinates identifying user inputs relative to scanned image. For example, and without limitation, user inputs may contain correlated positional coordinates locating user inputs relative to a reference point (e.g. a bottom left corner of initial scanned image). In one or more embodiments, reference points may be defined based on initial slide image, objects within initial slide image and/or the like. For example, and without limitation, a reference point may include a particular location on slide label, a bounding region and/or the like. In one or more embodiments, positional coordinates of user input may be determined as distance from various reference points, such as and without limitation, bounding regions, slide labels and/or the like. In one or more embodiments, transformed Unser inputs 176 may include positional coordinates of user inputs relative to a new reference coordinate system generated by slide 112 and/or a new image of slide. In one or more embodiments. In one or more embodiments, processor 108 may generate transformed user input 176 by identifying coordinates within slide 124 that properly reflect the horizontal and/or vertical distance of user input 140 from second bounding region 172 and/or slide label 128. In one or more embodiments, processor 108 may modify distances based on changes in orientation. For example, and without limitation, an orientation of 90 degrees may result in horizontal coordinates being converted to vertical coordinates and vice versa. In one or more embodiments, processor 108 may use multiple points within a bounding region and/or multiple points within slide label 128 in order to ensure that user input 140 is properly mapped relative to the multiple points. In one or more embodiments, processor 108 may be configured to ensure that transformed user input 176 is localized relative to second bounding region 172. In one or more embodiments, mapping the transformed user input 176 to the at least a corresponding region 156 on the at least a slide 124 includes localizing the user input 140 relative to the second bounding region 172. In one or more embodiments, processor 108 may be configured to identify second bounding region 172 and identify a position of user input 140 relative to the bounding region. In an embodiment, user inputs 140 may be bounding within the bounding region. In one or more embodiments, processor 108 may generate a first coordinate system for first bounding region 168. In one or more embodiments, processor 108 may apply one or more matrix transformation processes in order to generate a second coordinate system. In one or more embodiment, second coordinate system may be configured for second bounding region 172 and account for changes between first bounding region 168 and second bounding region 172.

With continued reference to FIG. 1, each corrective action 152 within user input may include a position and/or positional coordinates. In one or more embodiments, transforming user input 140 may include transforming the positions and/or positional coordinates of corrective actions. In one or more embodiments, initial position may include a plurality of initial positions wherein the plurality of initial positions include positions and/or positional coordinates of corrective actions 152. In one or more embodiments, transforming user input includes transforming positional coordinates of corrective actions and mapping corrective actions onto slide 112. In one or more embodiments, positional coordinates of corrective actions may be transformed such that they are properly mapped onto slide 112 and/or a subsequent image of slide 112. In one or more embodiments, transforming corrective actions may include transforming positional coordinates of a bounding box and mapping the transformed positional coordinates of bounding box onto slide.

With continued reference to FIG. 1, processor is configured to digitally map user input to initial scanned image in order to retrieve positional coordinates of user input relative to initial slide image. In one or more embodiments, transformed user input includes positional coordinates of user input relative to slide 112 and/or a subsequent slide image. In one or more embodiments, processor may be configured to identify user input by identifying positional coordinates of user input relative to initial slide image. In one or more embodiments, positional coordinates may include distances from given reference points, such as but not limited to, bounding regions, slide labels, specimens and/or the like. In one or more embodiments, transformed user input may include positional coordinates relative to slide, wherein positional coordinates may change due to changes in initial orientation and subsequent orientation. In one or more embodiments, each user input and/or corrective action may include a separate set of positional coordinates.

With continued reference to FIG. 1, processor 108 is configured to map the transformed user input 176 to the at least a corresponding region 156 on the at least a slide 124. In one or more embodiments, mapping may include identifying positional coordinates of user input relative to slide 124 and/or relative to a subsequent image of slide. In one or more embodiments, coordinates and/or positions associated with user input 140 may be transformed, and as a result, user input 140 may be properly mapped onto slide 124. In one or more embodiments, user input 140 may be mapped to the same corresponding regions 156 between initial scanned image 144 and slide 124. For example, without limitation user input 140 may be mapped to an edge of specimen in instances in which user input 140 was originally mapped to an edge of specimen within initial scanned image 144. In or more embodiments, processor 108 may be configured to map transformed user input 176 by identifying locations of user input 140 relative to slide 124, slide label 128, second bounding region 172 and/or the like. In one or more embodiments, processor 108 may be configured to digitally map user input 140 to initial slide 124 image as described in reference to at least FIG. 2. In one or more embodiments, digital mapping may result in the generation of coordinates and/or positions of user input 140 relative to initial slide 124 image, first bounding region 168, unique identifier 132, slide label 128 and/or the like.

With continued reference to FIG. 1, processor 108 is configured to generate one or more scanner commands 180 as a function of the transformed user input 176. In one or more embodiments, scanner commands 180 may be generated in any way as described in this disclosure such as in reference to at least FIG. 2. In one or more embodiments, transformed user input 176 may be used similarly to that of user inputs 140 in order to generate scanner commands 180 as described in reference to at least FIG. 2. In one or more embodiments, transformed user inputs 140 may be used in lieu of user input 140 in order to generate in order to accommodate for changes in orientation and/or position of slide 124. In one or more embodiments, scanning commands may be generated based on a corresponding region 156 indicating within user input 140 where scanning system 120 may be configured to focus or not focus on a particular region. In one or more embodiments, scanner commands 180 may be generated based on bounding boxes, wherein bounding boxes may indicate to processor 108 that a particular region should be focused on or ignored. In one or more embodiments, scanning commands may include rescanning parameters as described in reference to at least FIG. 2. In one or more embodiments, rescanning parameters may include, but are not limited to resolution, magnification, focus settings, illumination intensity, scanning speed, or sensor sensitivity of a scanner in a scanning system 120. In one or more embodiments, each corrective action 152 within user input 140 and/or transformed may be used to generate a differing scanning command and/or rescanning parameter. In one or more embodiments, scanner commands 180 may be used to configure rescan operation as described in reference to at least FIG. 2.

With continued reference to FIG. 1, apparatus may include a plurality of predetermined scanner commands 184. A "predetermined scanner command" refers to a set of instructions for scanner system that were initially used to generate initial slide 124 image. for example, and without limitation predetermined scanner commands 184 may include a particular focus, a particular illumination and/or the like that were used to capture and/or generate initial scanned image 144. In one or more embodiments, predetermined scanner commands 184 may be used as a default when capturing images of slides 124. In one or more embodiments, predetermined scanner commands 184 may include initial parameters as described in reference to at least FIG. 2. In one or more embodiments, predetermined scanner commands 184 may include preconfigured scanning parameters that may be used to scan a slide 124. In one or more embodiments, predetermined scanner commands 184 may be stored on database 116 and/or in a local memory and used when scanning initial slide 124 image. In one or more embodiments, scanner commands 180 may be used to replace one or more predetermined scanner commands 184 in order to generated re-scanned image 136. In one or more embodiments, scanner commands 180 that conflict with predetermined scanner commands 184 may be prioritized while the remaining predetermined scanner commands 184 may remain the same. In one or more embodiments, processor 108 may prioritize transformed user input 176 by prioritizing scanner commands 180 over conflicting predetermined scanner commands 184. In one or more embodiments, processor 108 may compare scanner commands 180 to plurality of predetermined scanner commands 184 when re-scanning slide 124 and remove predetermined scanner commands 184 that conflict with scanner commands 180. In one or more embodiments, processor 108 may prioritize transformed user input 176 by prioritizing scanner commands 180 generation as a function of user input 140. In one or more embodiments, processor 108 may prioritize transformed user input 176 by prioritizing corresponding regions 156 identified within user input 140. In one or more embodiments, processor 108 is configured to generate one or more scanner commands 180 as a function of the transformed user input 176 wherein the one or more scanner commands 180 is configured to command the scanning system 120 to prioritize the transformed user input 176 when rescanning the at least a slide 124. In one or more embodiments, processor 108 is further configured to transmit the scanner command 180 to the scanning system 120 to generate the at least a re-scanned image 136. In one or more embodiments, transmitting scanner command 180 may be done in any way as described in this disclosure such as in reference to at least FIG. 2.

With continued reference to FIG. 1, In one or more embodiments, processor 108 may perform rescanning operation. In one or more embodiments, processor 108 may perform rescanning operation may adjust rescanning parameters of a scanner and re-capture scanned image to produce a sharper and more accurate digital representation. In another non-limiting example, a user may identify a region of interest 148 on a scanned image and/or initial scanned image 144 using a graphical user interface and select it for rescanning. Continuing, rescanning operation may then be executed by configuring scanner to capture higher-resolution data for the specified area, providing detailed imagery for further analysis. In some embodiments, initial scanning parameters used for scanning operation may be used for rescanning operation 117. In an embodiment, without limitation, rescanning operation 117 may involve identifying discrepancies between an original scanned image and a target data model, such as missing tissue regions.

Figure 2:
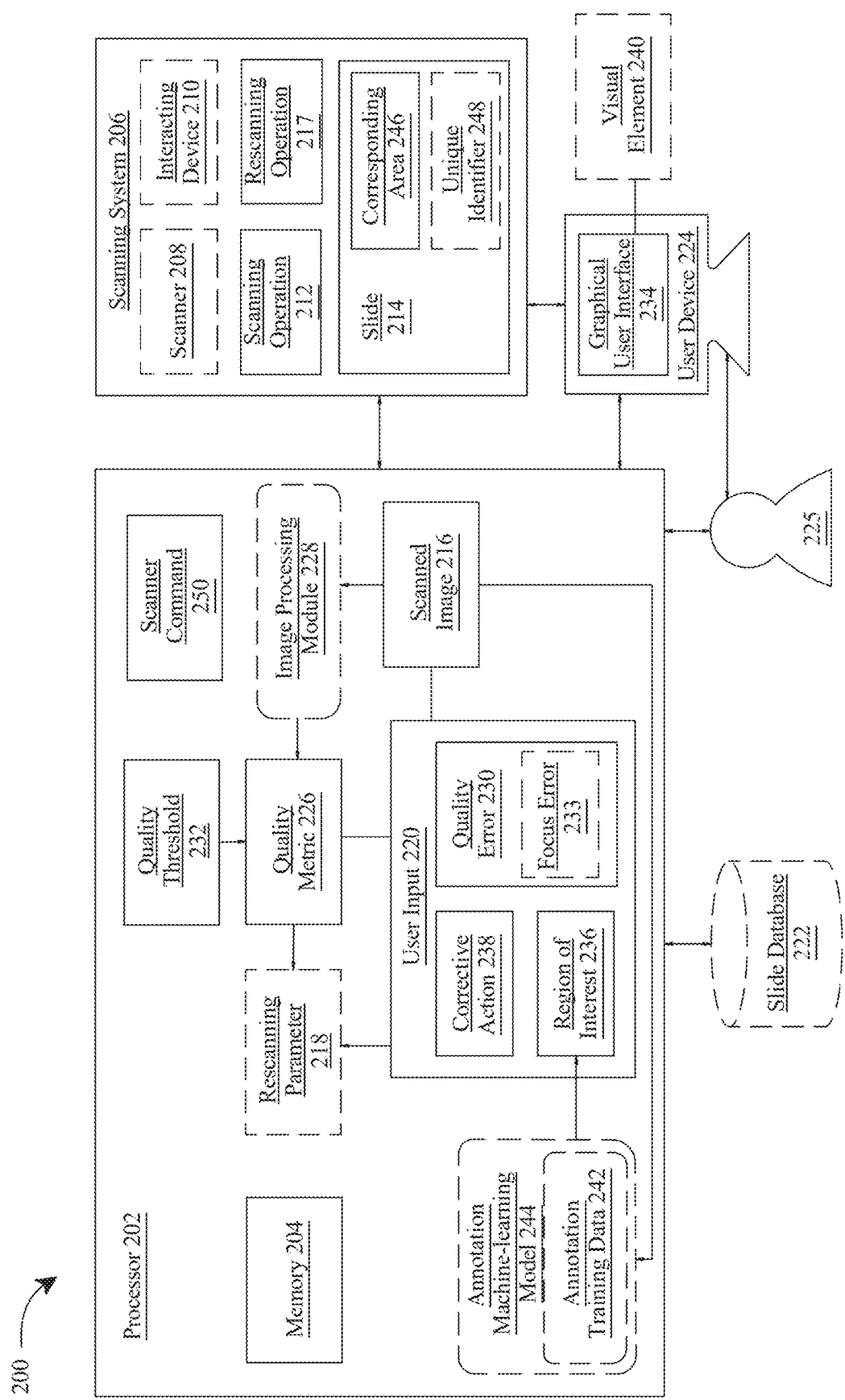
FIG. 2 illustrates a block diagram of an exemplary apparatus for rescan workflow management in automated scanning systems.

Referring now to FIG. 2, an exemplary embodiment of an apparatus 200 for rescan workflow management in automated scanning systems is illustrated. Apparatus 200 includes at least a processor 202. Processor 202 may include, without limitation, any processor described in this disclosure. Processor 202 may be included in a computing device. Processor 202 may include any computing device as described in this disclosure, including without limitation a microcontroller, microprocessor, digital signal processor (DSP) and/or system on a chip (SoC) as described in this disclosure. Processor 202 may include, be included in, and/or communicate with a mobile device such as a mobile telephone or smartphone. Processor 202 may include a single computing device operating independently, or may include two or more computing device operating in concert, in parallel, sequentially or the like; two or more computing devices may be included together in a single computing device or in two or more computing devices. Processor 202 may interface or communicate with one or more additional devices as described below in further detail via a network interface device. Network interface device may be utilized for connecting processor 202 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 202 may include but is not limited to, for example, a computing device or cluster of computing devices in a first location and a second computing device or cluster of computing devices in a second location. Processor 202 may include one or more computing devices dedicated to data storage, security, distribution of traffic for load balancing, and the like. Processor 202 may distribute one or more computing tasks as described below across a plurality of computing devices of computing device, which may operate in parallel, in series, redundantly, or in any other manner used for distribution of tasks or memory between computing devices. Processor 202 may be implemented, as a non-limiting example, using a "shared nothing" architecture.

With continued reference to FIG. 2, processor 202 may be designed and/or configured to perform any method, method step, or sequence of method steps in any embodiment described in this disclosure, in any order and with any degree of repetition. For instance, processor 202 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 202 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, apparatus 200 includes a memory 204 communicatively connected to processor 202. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 2, apparatus 200 includes a scanning system 206. For the purposes of this disclosure, a "scanning system" is a system that is configured to perform scanning. As a non-limiting example, scanning system 206 may include one scanner 208. In some embodiments, scanning system may include a group of components. As another non-limiting example, scanning system 206 may include a plurality of scanners 208, interacting device 210, slide storage, or the like. Scanning system 206 is configured to initiate a scanning operation 212 for at least a slide 214 to generate at least a scanned image 216. In a non-limiting example, scanning system 206 may be configured to scan a slide 214 and generate a scanned image 216 of the slide 214. In some embodiments, scanning system 206 may be configured for any type of scanning; for instance, and without limitation, slide scanning, pho scanning, document scanning, and the like. For the purposes of this disclosure, a "scanning operation" is a process that a scanning system produces a scanned image from a slide. In some embodiments, scanning operation 212 may include selecting a slide 214 from a slide storage, placing the slide 214 on a scanner 208, scanning the slide 214 and generating a scanned image 216 using the scanner 208, removing the slide 214 from the scanner, storing the slide 214 to the slide storage, and/or the like. In some embodiments, scanning operation 212 may include a rescanning operation 217. As used in this disclosure, a "rescanning operation" is a process to re-capture or re-analyze an image of a physical slide. As a non-limiting example, rescanning operation 217 may include selecting a slide 214 from a slide storage, adjusting rescanning parameters 218 of a scanner 208, placing the slide 214 on the scanner 208, rescanning the slide 214 and generating a scanned image 216 using the scanner 208, removing the slide 214 from the scanner 208, storing the slide 214 to the slide storage, and/or the like. The rescanning parameter 218 disclosed herein is further described in this disclosure. In a non-limiting example, rescanning operation 217 may be configured to address identified errors, improve image quality, or capture additional data based on a specified condition or user input 220. The user input 220 disclosed herein is further described in this disclosure. In some embodiments, scanning operation 212 and rescanning operation 217 may be configured for any type of scanning. For example, and without limitation, scanning operation 212 and rescanning operation 217 may be configured for slide scanning, photo scanning, document scanning, and the like.

With continued reference to FIG. 2, for the purposes of this disclosure, a "slide" is a thin flat component used to hold objects for examination. As a non-limiting example, slide 214 may include a microscopic slide. For the purposes of this disclosure, a "scanned image" is a digital representation of a physical slide or object. As a non-limiting example, scanned image 216 may be a high-resolution digital image of a pathology specimen prepared on a microscope slide, scanned using a whole slide imaging (WSI) system. In another non-limiting example, scanning system 206 may be configured to executes instructions of a computer program. In another non-limiting example, scanning system 206 may be configured to store data into a hard drive. In some cases, scanning system 206 may include a plurality of scanning systems 206. As a non-limiting example, processor 202 may be configured to receive scanned images 216 from each scanner 208 of a plurality of scanners in five scanning systems 206 or any numbers of scanning systems 206. In some embodiments, scanning system 206 may include a cluster of scanners. For the purposes of this disclosure, a "scanner" is a device or an element of a device that outputs a scanned image. In a non-limiting example, scanner 208 may include a whole slide scanner used in pathology to digitize glass microscope slides containing tissue samples, enabling scanned image generation for remote diagnosis or archival purposes. In another non-limiting example, scanner 208 may include a fluorescence slide scanner designed to capture high-resolution images of slides prepared with fluorescently labeled biological specimens, allowing detailed examination of cellular or molecular markers in a clinical or research setting. In some embodiments, scanner 208 may be configured to receive a slide 214 from an interacting device 210. Interacting device 210 disclosed herein is further described below. In some embodiments, scanner 208 may be configured to examine, use, or the like a slide 214.

With continued reference to FIG. 2, for the purposes of this disclosure, an "interacting device" is a device that interacts with a functioning component to perform a specific task. Exemplary interacting device 210 may include a robotic arm, computing device, or the like. For the purposes of this disclosure, a "robotic arm" is a mechanical device or manipulator that mimics the structure and function of a human arm. In a non-limiting example, a robotic arm may pick up a slide 214 from a first slide storage, carry the slide 214 to scanner 208 and place the slide 214 on the scanner 208. Then, continuing the non-limiting example, the robotic arm may pick the grip slide 214 from the scanner 208, carry the slide 214 to a second slide storage and drop the slide 214 off to the second slide storage. In some cases, robotic arm or may interact with a plurality of scanner 208. For the purposes of this disclosure, a "slide storage" is a container that stores a slide. As a non-limiting example, slide storage may include a container for picking a slide 214 up using interacting device 210 or for dropping slide 214 off after use.

With continued reference to FIG. 2, in some embodiments, interacting device 210 disclosed herein may be consistent with a robotic arm described in U.S. patent application Ser. No. 18/382,386, filed on Oct. 20, 2023, entitled "APPARATUS AND METHOD OF USE OF A MECHANISM THAT CONVERTS ROTARY MOTION INTO LINEAR MOTION," which is incorporated herein by reference in its entirety. Additional disclosure related to interacting device 110 may be found in U.S. patent application Ser. No. 18/385,978, filed on Nov. 1, 2023, entitled "METHOD AND SYSTEM FOR AUTOMATED RETRIEVAL AND SCANNING OF GLASS SLIDES WITHIN A RESTRICTED SPATIAL ENVIRONMENT," which is incorporated herein by reference in its entirety. In some embodiments, scanning system 106, scanner 108 and interacting device 210 disclosed herein may be consistent, respectively, with a cluster, functioning component and interacting device described in U.S. patent application Ser. No. 18/538,959, filed on Jul. 23, 2024, entitled "APPARATUS AND METHOD OF HOT-SWAPPING A COMPONENT OF A COMPONENT UNIT IN A CLUSTER," which is incorporated herein by reference in its entirety.

With continued reference to FIG. 2, memory 204 contains instructions configuring processor 202 to receive at least a scanned image 216. In some embodiments, processor 202 may receive scanned image 216 from a scanner 208. In some embodiments, processor 202 may receive scanned image 216 from a slide database 222. in some embodiments, apparatus 200 may include a slide database 222. As used in this disclosure, "slide database" is a data structure configured to store data associated with a slide. As a non-limiting example, slide database 222 may store scanned image 216, and the like as described below. In one or more embodiments, slide database 222 may include inputted or calculated information and datum related to a slide 214. In some embodiments, a datum history may be stored in slide database 222. As a non-limiting example, the datum history may include real-time and/or previous inputted data related to slide 214. As a non-limiting example, slide database 222 may include instructions from a user, who may be an expert user, a past user in embodiments disclosed herein, or the like, where the instructions may include examples of the data related to slide 214.

With continued reference to FIG. 2, in some embodiments, processor 202 may be communicatively connected with slide database 222. For example, and without limitation, in some cases, slide database 222 may be local to processor 202. In another example, and without limitation, slide database 222 may be remote to processor 202 and communicative with processor 202 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 202 connect directly, dynamically, and non-hierarchically to as many other computing devices as possible. A "network topology" as used in this disclosure is an arrangement of elements of a communication network. The network may use an immutable sequential listing to securely store slide database 222. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 2, in some embodiments, slide database 222 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 2, in some embodiments, processor 202 may receive scanned image 216 from a user device 224. For the purposes of this disclosure, a "user device" is any device that a user uses to input data. For the purposes of this disclosure, a "user" is any individual or entity that uses an apparatus. As a non-limiting example, user device 224 may include a laptop, desktop, tablet, mobile phone, smart phone, smart watch, kiosk, screen, smart headset, or things of the like. In some embodiments, user device 224 may include an interface configured to receive inputs from a user 225. In some embodiments, a user 225 may manually input any data (e.g., scanned image 216) into apparatus 200 using user device 224. In some embodiments, user 225 may have a capability to process, store or transmit any information independently.

With continued reference to FIG. 2, memory 204 contains instructions configuring processor 202 determine a quality metric 226 of at least a scanned image 216 using at least a quality control algorithm. As used herein, a "quality metric" is a datum describing an assessment of a quality, section, or feature of an image. In a non-limiting example, quality metric 226 may describe a degree to which a scanned image 216 and/or a section of scanned image 216 is in focus. Non-limiting examples of quality metrics 226 include localization quality metric, focus sampling quality metric 226, biopsy plane estimation quality metric, z-stack acquisition quality metric, banding quality metric, and stitching quality metric, each of which is described further herein. In some embodiments, processor 202 may determine multiple quality metrics. For example, processor 202 may determine localization quality metric, focus sampling quality metric 226, biopsy plane estimation quality metric, z-stack acquisition quality metric, and stitching quality metric simultaneously. In some embodiments, processor 202 may determine one or more rescanning parameters 218 and/or capture one or more images based on such quality metrics 226. For example, processor 202 may first determine localization quality metric, then may determine a rescanning parameter 218 and may capture a subsequent image using such rescanning parameter 218. Processor 202 may then determine focus sampling quality metric 226, may determine a subsequent rescanning parameter 218, and may capture a subsequent image using such rescanning parameter 218. The rescanning parameter 218 disclosed herein is further described below. In some embodiments, quality metric 226 may be stored in slide database 222. In some embodiments, processor 202 may retrieve quality metric 226 from slide database 222.

With continued reference to FIG. 2, as used herein, a "localization quality metric" is a quality metric which assesses a localization of a sample in a scanned image. In some embodiments, localization quality metric may include one or more composite measures used to detect and position a sample (e.g., tissue) within a scanned image 216. As used herein, a "biopsy plane estimation quality metric" is a quality metric which assesses identification of a plane which contains a biological specimen. As used herein, a "focus sampling quality metric" is a quality metric which assesses identification of a focal setting at which a selected point is in focus. As used herein, a "z-stack acquisition quality metric" is a quality metric which assesses the fidelity, clarity, and accuracy of a scanned image captured during a z-stack acquisition process. In some embodiments, z-stack acquisition quality metric 226 may include overall quality of a series of scanned images 216 acquired at different focal depths to represent a three-dimensional structure or feature of a specimen. As used herein, a "stitching quality metric" is a quality metric which assesses accuracy and fidelity of the process of combining multiple image segments or tiles into a single cohesive image. In some embodiments, stitching quality metric 226 may evaluate effectiveness of a stitching process in aligning adjacent image segments of scanned images 216 along their borders and ensuring seamless integration of overlapping regions. As used herein, a "banding quality metric" is a quality metric which assesses presence, severity, or impact of banding artifacts in an image. As a non-limiting example, banding artifacts may include unintended repetitive patterns, lines, or bands that can occur in scanned image 216 due to inconsistencies in illumination, sensor performance, or image processing algorithms. In some embodiments, additional disclosure related to quality metric 226 may be found in U.S. patent application Ser. No. 18/602,947, filed on Mar. 12, 2024, entitled "SYSTEMS AND METHODS FOR INLINE QUALITY CONTROL OF SLIDE DIGITIZATION," which is incorporated herein by reference in its entirety.

With continued reference to FIG. 2, for the purposes of this disclosure, a "quality control algorithm" is an algorithm that determines a quality metric of a scanned image. In some embodiments, quality control algorithm may include any algorithms described in this disclosure configured for determining focus, banding, or missing tissue, and the like. As a non-limiting example, quality control algorithm may include image processing module 228. In some embodiments, processor 202 may determine quality metric 226 using an image processing module 228. As used in this disclosure, an "image processing module" is one or more image processing technique designed to perform processing tasks and or operations to a digital image. For example, and without limitation, image processing module 228 may be configured to compile plurality of digital images to create an integrated image. In an embodiment, image processing module 228 may include a plurality of software algorithms that can analyze, manipulate, or otherwise enhance an image, such as, without limitation, a plurality of image processing techniques as described below. Image processing module 228 may include, without limitation, modules that perform modifications such as random rotation, color jitter, Gaussian blur, perspective transform, shear transform, shadow casting, reflected light, ink color swap, noise texturization, Gaussian noise, salt and pepper noise, folding and creasing, crumpled paper effect, and the like, and described in detail above. In a non-limiting example, image processing module 228 may include any combination of image processing module 228. In some cases, image processing module 228 may be implemented with one or more image processing libraries such as, without limitation, OpenCV, PIL/Pillow, ImageMagick, and the like. Image processing module 228 may include, be included in, or be communicatively connected to processor 202, and/or memory 204.

With continued reference to FIG. 2, in an embodiment, image processing module 228 may be configured to compress and/or encode scanned images 216 to reduce the file size and storage requirements while maintaining the essential visual information needed for further processing steps as described below. In an embodiment, compression and/or encoding of plurality of images may facilitate faster transmission of images. In some cases, image processing module 228 may be configured to perform a lossless compression on images, wherein the lossless compression may maintain the original image quality of images. In a nonlimiting example, image processing module 228 may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of scanned images 216 may include converting the file format of each image into PNG, GIF, lossless JPEG3000 or the like. In an embodiment, images compressed via lossless compression may be perfectly reconstructed to the original form (e.g., original image resolution, dimension, color representation, format, and the like) of images. In other cases, image processing module 228 may be configured to perform a lossy compression on plurality of images, wherein the lossy compression may sacrifice some image quality of images to achieve higher compression ratios. In a non-limiting example, image processing module 228 may utilize one or more lossy compression algorithms, such as, without limitation, Discrete Cosine Transform (DCT) in JPEG or Wavelet Transform in JPEG3000, discard some less significant information within images, resulting in a smaller file size but a slight loss of image quality of images. In such embodiment, compressing and/or encoding each image of a plurality of images may include converting the file format of each image into JPEG, WebP, lossy JPEG3000, or the like.

With continued reference to FIG. 2, in an embodiment, image processing module 228 may determine a degree of blurriness of images. In a non-limiting example, image processing module 228 may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module 228 may be configured to rank scanned images 216 according to quality metric 226 and select a highest-ranking image from a plurality of scanned images 216.

With continued reference to FIG. 2, memory 204 contains instructions configuring processor 202 to determine a quality error 230 by comparing quality metric 226 to a quality threshold 232. For the purposes of this disclosure, a "quality error" is an issue, defect, or deviation within a scanned image that affects a quality metric of the scanned image. Quality error 230 identifies a quality metric 226 below a quality threshold 232. The quality threshold 232 is further described in detail below. In some embodiments, user input 220 may confirm or identify a quality error 230. In some embodiments, user input 220 may confirm or identify that a quality metric 226 is higher than quality threshold 232. In a non-limiting example, user input 220 may indicate that there is no quality error 230 in scanned image 216 and the scanned image 216 may get stored in a database. In some embodiments, quality error 230 may be associated with quality metric 226. As a non-limiting example, quality error 230 may include missing tissue, banding error, stitching error, focus error 233, scan area error, and the like. In a non-limiting example, quality error 230 may include specimen not detected or missed in scanned image 216, out-of-focus regions caused by artifacts or thick samples, banded artifacts (e.g., stitching errors or calibration issues), ghost-like artifacts due to errors in stitching adjacent fields of view, and the like. For the purposes of this disclosure, a "focus error" is a deviation or inconsistency in the sharpness or clarity of a scanned image. In some embodiments, user 225 may manually determine quality error 230. In some embodiments, processor 202 may determine quality error 230 as a function of quality metric 226 and quality threshold 232. In some embodiments, user 225 may analyze scanned image 216 or quality metric 226 of scanned image 216 and determine that scanned image 216 may include quality error 230. In some embodiments, processor 202 may determine quality error 230 based on quality metric 226 and quality threshold 232. In a non-limiting example, processor may determine that a scanned image 216 has quality error 230 when quality metric 226 of the scanned image 216 is below a quality threshold 232. In some embodiments, quality error 230, quality metric 226 and quality threshold 232 may be stored in slide database 222. In some embodiments, graphical user interface (GUI) 234 may include highlighted elements that highlights quality error 230 of scanned image 216. As used in this disclosure, "highlighted elements" are regions, objects, or features within a graphical user interface that are emphasized through visual indicators.

With continued reference to FIG. 2, as used in this disclosure, a "quality threshold" is a predefined or dynamically generated reference value, condition, or set of criteria against which data is compared to determine the need for additional actions. In a non-limiting example, quality threshold 232 may be a baseline metric for determining quality error 230 based on a quality metric 226. As a non-limiting example, quality threshold 232 may include a metric for resolution, brightness, or focus sharpness, banding, stitching, localization, biopsy plane estimation, established by apparatus 200 or user 225 for a scanned image 216. For example, and without limitation, if an initial scan does not meet quality threshold 232, processor 202 may trigger rescanning operation 217 to improve the quality. In another non-limiting example, quality threshold 232 may be a specific region of interest identified in a digital slide for diagnostic purposes. For example, and without limitation, processor 202 may compare scanned image 216 to quality threshold 232 and initiate rescanning if discrepancies, such as missing tissue sections or artifacts, are detected. In an embodiment, without limitation, quality threshold 232 may represent a threshold value for fluorescence intensity in a scanned image 216 used in immunohistochemistry. Without limitation, if the fluorescence signal of the scanned image 216 falls below this value, the processor 202 may adjust rescanning parameters 218, such as exposure time, and may perform a rescanning operation 217 to achieve a more accurate representation. In some embodiments, quality threshold 232 may be stored in slide database 222. In some embodiments, user 225 may manually determine quality threshold 232.

With continued reference to FIG. 2, in some embodiments, processor 202 may generate quality threshold 232 based on historical quality errors. In some embodiments, processor 202 may update quality threshold 232 based on corrective actions 238 and/or user input 220. In some embodiments, processor 202 may generate or update quality threshold 232 using a threshold machine-learning model. In some embodiments, processor 202 may be configured to generate threshold training data. In a non-limiting example, threshold training data may include correlations between exemplary quality thresholds, exemplary quality errors, exemplary corrective actions, and/or exemplary user inputs. In some embodiments, threshold training data may be stored in database. In some embodiments, threshold training data may be received from one or more users, database, external computing devices, and/or previous iterations of processing. As a non-limiting example, threshold training data may include instructions from a user, who may be an expert user, a past user in embodiments disclosed herein, or the like, which may be stored in memory and/or stored in database, where the instructions may include labeling of training examples. In some embodiments, threshold training data may be updated iteratively on a feedback loop. As a non-limiting example, processor 202 may update threshold training data iteratively through a feedback loop as a function of quality error 230, corrective action 238, user input 220, quality metric 226, or the like. In some embodiments, processor may be configured to generate a quality machine-learning model. In a non-limiting example, generating quality machine-learning model may include training, retraining, or fine-tuning quality machine-learning model using threshold training data or updated threshold training data. In some embodiments, processor 202 may be configured to determine quality threshold 232 using quality machine-learning model (i.e. trained or updated quality machine-learning model). In some embodiments, generating training data and training machine-learning models may be simultaneous.

With continued reference to FIG. 2, in some embodiments, processor 202 may determine quality error 230 using an image processing module 228, or an error machine-learning model. In some embodiments, processor 202 may generate error training data including exemplary scanned images and exemplary quality errors, train error machine-learning model using the error training data and determine quality error 230 using the trained error machine-learning model. In some embodiments, error machine-learning model and error training data disclosed herein may be consistent with any machine-learning model and training data described in this disclosure. In some embodiments, error training data may be stored in slide database 222. In some embodiments, error training data may be received from one or more users, slide database 222, external computing devices, and/or previous iterations of processing. As a non-limiting example, error training data may include instructions from a user, who may be an expert user, a past user in embodiments disclosed herein, or the like, which may be stored in memory and/or stored in slide database 222, where the instructions may include labeling of training examples. In some embodiments, error training data may be updated iteratively on a feedback loop. As a non-limiting example, processor 202 may update error training data iteratively through a feedback loop as a function of scanned image 216, quality threshold 232, quality metric 226, output of any machine-learning models described in this disclosure, or the like.

With continued reference to FIG. 2, in some embodiments, processor 202 may generate notification or user interface that notifies a user 225 whether at least a slide 214 has to be rescanned or not based on quality error 230, quality metric 226 and/or quality threshold 232. For the purposes of this disclosure, a "notification" is an indication to inform a user. In some embodiments, processor 202 may transmit notification to user device 224. In some embodiments, notification may include audio, text, image, vibration, and the like. In some embodiments, notification may include a text message, notification sound, phone call, notification banner, or the like.

With continued reference to FIG. 2, memory 204 contains instructions configuring processor 202 to receive a user input 220 for at least a scanned image 216 with a quality error 230. For the purposes of this disclosure, a "user input" is an action, command, or data entry provided by a user to interact with a system. In some embodiments, user input 220 may include touch, voice, text, or graphical selection. In some embodiments, user input 220 may be input by a plurality of users 225. As a non-limiting example, user 225 may include a quality control engineer or technician, research technician, researcher, and the like. In some embodiments, user input 220 may determine whether slide 214 needs to be rescanned.

With continued reference to FIG. 2, in some embodiments, user input 220 may identify at least a region of interest (ROI) 236 on at least a scanned image 216 and one or more corrective actions 238 associated with the at least a ROI 236 and a quality metric 226 and/or quality error 230. For the purposes of this disclosure, a "region of interest" is an area within a scanned image that is selected for processing or analysis. As a non-limiting example, ROI 236 may include an area within a scanned image 216 that has a specimen or tissue. In some embodiments, user 225 may input ROI 236 using graphical tools through graphical user interface 234. In some embodiments, processor 202 may determine or generate ROI 236 through the use of machine-learning model or as a function of quality error 230.

With continued reference to FIG. 2, user input includes corrective actions 238. For the purposes of this disclosure, a "corrective action" is an operation, adjustment, or modification applied to a scanned image or associated metadata. As a non-limiting example, corrective action 238 may include updating metadata, data related to slide 214, parameters of slide 214, and the like. In some embodiments, corrective action 238 may be conducted by a user 225 or by a processor 202. In a non-limiting example, processor 202 may conduct a corrective action 238 when quality error 230 is determined. In some embodiments, corrective action 238 may be configured to rectify quality error 230. As a non-limiting example, corrective action 238 may include adding, modifying or removing a visual element 240 using graphical user interface 234. The visual element 240 disclosed herein is further described below. For example, and without limitation, corrective action 238 may include drawing, highlighting, or bounding box placing, or by specifying coordinates or dimensions within scanned image 216. For example, and without limitation, corrective action 238 may include placing a bounding box (visual element 240) on a scanned image 216 for tissue or sample that is not identified through a system (e.g., localization quality metric). For example, and without limitation, corrective action 238 may include adjusting a size of a bounding box (visual element 240) on a scanned image 216 through graphical user interface (GUI) 234. The GUI 234 is further described in detail below. For example, and without limitation, corrective action 238 may include removing debris, artifacts, stains, smudges, DPX, or the like from a slide 214 and/or placing a sampling point or a bounding box (visual element 240) on a scanned image 216 to remove the specific ROI for rescanning. For example, and without limitation, corrective action 238 may include modifying bounding box to incorporate an area (ROI 236) that was not localized as the area includes specimens that are extremely tiny or faint (missing tissue quality error and/or localization quality metric), mark the modified bounding box using a visual element 240 indicating that the ROI 236 must be rescanned. For example, and without limitation, corrective action 238 may include modifying bounding box (visual element 240) from scanned image 216 to remove artifacts, debris, DPS, smudges or stain deposits when specimen was localized in the scanned image 216 but not scanned properly (missing tissue quality error and/or biopsy plane estimation quality metric) and place a sampling point (visual element 240) on ROI 236 of scanned image 216 indicating specimen for scanning or rescanning. For example, and without limitation, corrective action 238 may include correcting an optical centering either by a user 225 or technician for banding quality metric. For example, and without limitation, corrective action 238 may include calibrating a displacement for gradual workout in the calibrated displacement values (stitching error and/or stitching quality metric). For example, and without limitation, corrective action 238 may include adjusting a bounding box to remove a slide artifact within a scanned image 216 and place a sampling point on a region (ROI 236) that encloses by a sample on a scanned image 216 that has quality error due to artifacts that are included along with the specimen. For example, and without limitation, corrective action 238 may include a user removing bounding boxes through a user interface that are not meant to be scanned for a scanned image 216 that has any additional bounding boxes or ROIs 236 detected on scanned image 216 (scan area error) due to debris, smudges, stain deposits, and the like. For example, and without limitation, corrective action 238 may include reducing scanning area for rescanning operation 217. In some embodiments, receiving a user input 220 may include receiving a user input 220 including a modification of visual element 240 associated with at least an ROI 236 and determining at least one of one or more corrective actions 238 as a function of the modification of the visual element 240.

With continued reference to FIG. 2, for example, and without limitation, corrective action 238 may include increasing a stack size (e.g., z-stack) for a slide 214 that is marked for rescan due to focus error 233 and/or focus quality metric 226 that may be caused by massive folds or extremely thick specimen. For the purposes of this disclosure, "increasing a stack size" refers to capturing additional focal planes during the rescanning process to generate a more comprehensive z-stack. For the purposes of this disclosure, a "z-stack" is a series of images captured at varying focal depths to create a three-dimensional representation of the specimen. In some embodiments, corrective action 238 may include dynamically adjusting z-stack interval (the distance between focal planes) or extending the range of focal planes. For instance, and without limitation if the focus quality metric 226 falls below a predefined quality threshold 232, processor 202 may generate a scanner command 250 to modify z-stack parameters (e.g., rescanning parameter 218) for the affected region (ROI 236). In some embodiments, user input 220 may specify ROI 236 requiring enhanced z-stack coverage, allowing scanning system 206 to prioritize the ROI 236 during rescanning operation 217. Additional disclosure related to modifying stack size and rescanning operation may be found in U.S. patent application Ser. No. 18/226,058, filed on May 14, 2024, entitled "IMAGING DEVICE AND A METHOD FOR IMAGE GENERATION OF A SPECIMEN," which is incorporated herein by reference in its entirety.

With continued reference to FIG. 2, as used in this disclosure, a "visual element" is a component or feature within a system, display, or interface that conveys information through visual means. In a non-limiting example, visual element 240 may include text, images, icons, shapes, colors, and/or other graphical components designed to be perceived by a user 225. In a non-limiting example, visual element 240 may aid in communication, navigation, and/or interaction with the system. Without limitation, visual element 240 may be used to enhance user experience, guide behavior, and/or represent data visually in an intuitive or informative way. In some embodiments, visual element 240 may include any data transmitted to user device 224, and/or graphical user interface 234. In some embodiments, visual element 240 may include an interface, such as a button or menu. In some embodiments, visual element 240 may be interacted with using a user device 224 such as a smartphone, tablet, smartwatch, or computer. Additional disclosure related to visual element 240 and GUI 234 may be found in U.S. patent application Ser. No. 19/072,148, filed on Mar. 6, 2025, entitled "APPARATUS AND METHOD FOR CONTROL OF RESCANNING A SLIDE IN A GRAPHICAL USER INTERFACE," which is incorporated herein by reference in its entirety.

With continued reference to FIG. 2, in some embodiments, if there is no user input 220, then processor 202 may proceed to rescanning operation 217 without any modification or update. In some embodiments, determining quality error 230 may include generating annotation training data 242, wherein the annotation training data 242 may include exemplary scanned images correlated to exemplary ROIs with quality errors, training an annotation machine-learning model 244 using the annotation training data 242, determining at least a ROI 236 using the trained annotation machine-learning model 244 and determining quality error 230 as a function of the at least a ROI 236. In a non-limiting example, processor 202 may determine quality metric 226 of ROI 236 of scanned image 216. In another non-limiting example, processor 202 may determine quality metric 226 of whole scanned image 216. For the purposes of this disclosure, "annotation training data" is data containing correlations that a machine-learning process may use to model relationships between scanned images and ROIs. For the purposes of this disclosure, an "annotation machine-learning model" is a machine-learning model that determines ROIs. In some embodiments, annotation training data 242 may be stored in slide database 222. In some embodiments, annotation training data 242 may be received from one or more users, slide database 222, external computing devices, and/or previous iterations of processing. As a non-limiting example, annotation training data 242 may include instructions from a user, who may be an expert user, a past user in embodiments disclosed herein, or the like, which may be stored in memory and/or stored in slide database 222, where the instructions may include labeling of training examples. In some embodiments, annotation training data 242 may be updated iteratively on a feedback loop. As a non-limiting example, processor 202 may update annotation training data 242 iteratively through a feedback loop as a function of scanned image 216, quality metric 226, quality threshold 232, historical user inputs, or the like. In a non-limiting example, generating annotation machine-learning model 244 may include training, retraining, or fine-tuning annotation machine-learning model 244 using annotation training data 242 or updated annotation training data 242. In some embodiments, annotation machine-learning model 244 may include machine vision module or image processing module. In some embodiments, receiving user input 220 may include generating a graphical user interface 234 including at least a ROI 236 determined using annotation machine-learning model 244, wherein the at least a ROI 236 may be visually indicated within at least a scanned image 216 using a visual element 240. As a non-limiting example, ROI 236 may be visually indicated using a bounding box or sampling point.

With continued reference to FIG. 2, receiving user input 220 may include generating a graphical user interface 234 including at least a scanned image 216 and quality metric 226. For the purposes of this disclosure, a "user interface" is a means by which a user and a computer system interact; for example through the use of input devices and software. A user interface may include a graphical user interface (GUI) 234, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user 225 may interact with user interface in virtual reality. In some embodiments, a user may interact with the use interface using a computing device distinct from and communicatively connected to at least a processor 202. For example, a smart phone, smart, tablet, or laptop operated by a user 225. In an embodiment, user interface may include a graphical user interface 234. A "graphical user interface," as used herein, is a graphical form of user interface that allows users to interact with electronic devices. In some embodiments, GUI 234 may include icons, menus, other visual indicators or representations (graphics), audio indicators such as primary notation, and display information and related user controls. A menu may contain a list of choices and may allow users 225 to select one from them. A menu bar may be displayed horizontally across the screen such as pull-down menu. When any option is clicked in this menu, then the pull-down menu may appear. A menu may include a context menu that appears only when the user 225 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 2, memory 204 contains instructions configuring processor 202 to digitally map a user input 220 to at least a corresponding region 246 on at least a slide 214. For the purposes of this disclosure, a "corresponding region" is an area on a physical slide that aligns with or is associated with a region of interest (ROI) identified within a scanned image. In some embodiments, corresponding region 246 may represent a physical counterpart of ROI 236 and may serve as a target for actions, analysis, or validation processes (scanning operation 212 or rescanning operation 217). For the purposes of this disclosure, "mapping digitally" refers to a process of establishing a spatial or logical relationship between a corresponding region and a region of interest. In one or more embodiments, mapping digitally may refer to registering coordinates, pixels and/or voxels to a coordinate system. In one or more embodiments, pixels within an image may be registered to a relative coordinate system generated by the image. In one or more embodiments, processor may define a reference point within an image as the origin, wherein points within the image may be recorded as distances from the reference point. For example, and without limitation, a vertical distance of 100 pixels from the reference point and a horizontal distance of 100 pixels from the reference point may be recorded as [100,100]. In one or more embodiments, the pixels within an image may specify the bounds of a reference coordinate system. For example, and without limitation, an image having a resolution of 1920×1080 may contain a bound or maximum horizontal distance of 1920. In one or more embodiments, pixels within an image may be used to map objects within an image to a reference coordinate system generated by the image. In one or more embodiments, digitally mapping user inputs may include identifying locations of user inputs within an original and/or initially scanned image, such as scanned image 216. In one or more embodiments, digitally mapping may include identifying coordinates of objects within scanned image 216 relative to a coordinate system generated as a function of scanned image 216. In one or more embodiments, user inputs may be mapped relative to scanned image 216, wherein coordinates of user inputs may be identified along using a cartesian coordinate system and mapped on a reference coordinate system generated by scanned image 216. In one or more embodiments, one or more matrix transformation processes described in this disclosure may then be used to transform the coordinates of user inputs relative to a secondary and/to subsequent scanned image. In one or more embodiments, user input may include an initial orientation as described in reference to at least FIG. 1. In some embodiments, processor 202 may translate coordinates, dimensions, or positional information from region of interest 236 to corresponding region 246 or vice versa.

With continued reference to FIG. 2, in some embodiments, processor 202 may digitally map a user input 220 to at least a corresponding region 246 using a machine vision system. For the purposes of this disclosure, a "machine vision system" is a type of technology that enables a computing device to inspect, evaluate and identify still or moving images. In some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection (e.g., sample, tissue, or ROI 236), face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., unique identifier 248) detection and decoding. The unique identifier 248 is further described in detail below. In some cases, a machine vision process may additionally perform image capture and/or video recording.

With continued reference to FIG. 2, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 2, digitally mapping user input 220 to at least a corresponding region 246 on at least a slide 214 may include extracting a unique identifier 248 from at least a scanned image 216 and associating the user input 220 to the at least a slide 214 as a function of the unique identifier 248. for the purposes of this disclosure, a "unique identifier" is an identifier that is unique for an object among others. As a non-limiting example, the unique identifier 248 may include a universal product code (barcode), radio-frequency identification (RFID), cryptographic hashes, primary key, a unique sequencing of alpha-numeric symbols, or anything of the like that can be used to identify slide 214 or scanned image 216. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like.

With continued reference to FIG. 2, in some embodiments, extracting unique identifier 248 may include extracting unique identifier 248 using an optical character recognition (OCR). For the purposes of this disclosure, "optical character recognition" is a technology that enables the recognition and conversion of printed or written text into machine-encoded text. In some cases, the at least a processor 202 may be configured to recognize a keyword using the OCR to find unique identifier 248. As used in this disclosure, a "keyword" is an element of word or syntax used to identify and/or match elements to each other. In some cases, the at least a processor 202 may transcribe much or even substantially all scanned image 216.

With continued reference to FIG. 2, in some embodiments, optical character recognition or optical character reader (OCR) may include automatic conversion of images of written (e.g., typed, handwritten or printed text) text into machine-encoded text. In some cases, recognition of a keyword from scanned image 216 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 2, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 2, in some cases, OCR processes may employ pre-processing of scanned image 216. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the scanned image 216 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 2, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 2, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 4. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 2, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes scanned image 216. Since the adaptive classifier may have learned something useful a little too late to recognize characters on the first pass, a second pass may be run over the scanned image 216. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 2, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 2, memory 204 contains instructions configuring processor 202 to generate a scanner command 250 as a function of at least a corresponding region 246, wherein the scanner command 250 is configured to command a scanning system 206 to prioritize at least a corresponding region 246 when rescanning at least a slide 214. Memory 204 contains instructions configuring processor 202 to transmit the scanner command 250 to a scanning system 206. For the purposes of this disclosure, a "scanner command" is an instruction or set of instructions for to a scanning system to control or modify its operation. In some embodiments, scanner command 250 may include actions to be executed by scanning system 206. In some embodiments, user 225 may manually input scanner command 250. In some embodiments, scanner command 250 may be stored in slide database 222. In some embodiments, user inputs 220 or any results of user inputs 220 may be stored in slide database 222. In some embodiments, rescanning operation 217 may include checking slide database 222 for any manual quality control input to use. In a non-limiting example, if processor 202 finds user input 220 related to a slide to be rescanned from slide database 222, processor 202 may compare slides 214 or scanned images 216 from both scanning operation 212 and rescanning operation 217 and rescan the slide 214 as a function of the comparison. In some embodiments, if processor 202 cannot find user input 220 related to a slide to be rescanned from slide database 222, then processor 202 may proceed for a rescan without any modification.

With continued reference to FIG. 2, in some embodiments, generating scanner command 250 may include determining one or more rescanning parameters 218 for rescanning at least a slide 214 as a function of user input 220 and quality metric 226 and generating the scanner command 250 as a function of the one or more rescanning parameters 218. For the purposes of this disclosure, a "rescanning parameter" is a configurable or measurable attribute that defines or influences an operation, performance, or output of a scanner. As a non-limiting example, rescanning parameter 218 may include resolution, magnification, focus settings, illumination intensity, scanning speed, or sensor sensitivity of a scanner in a scanning system 206. As another non-limiting example, rescanning parameters 218 may include scanning mode (e.g., brightfield, fluorescence), z-stack interval, or dimensions of an area (that aligns with ROI 236 and/or corresponding region 246) to be scanned, and the like. In a non-limiting example, processor 202 may determine rescanning parameter 218 that can rectify quality error 230. In some embodiments, scanner command 250 may be configured to command at least a scanner 208 of a plurality of scanners 208 of the scanning system 206 to rescan at least a slide 214 as a function of one or more rescanning parameters 218. In some embodiments, scanner command 250 may be further configured to command an interacting device 210 of scanning system 206 to select at least a slide 214 to be rescanned as a function of unique identifier 248. In a non-limiting example, interacting device 210 may select at least a slide that matches unique identifier 248 from a plurality of slides stored in a slide storage. As another non-limiting example, rescanning parameter 218 may include any feature of robotic arm of a scanning system 206.

With continued reference to FIG. 2, in a non-limiting example, rescanning operation 217 may be triggered when processor 202 detects that the initial scan (scanned image 216) of a slide 214 is out of focus (focus error 233). Continuing, rescanning operation 217 may adjust rescanning parameters 218 of a scanner 208 and re-capture scanned image 216 to produce a sharper and more accurate digital representation. In another non-limiting example, a user 225 may identify a region of interest 236 on a scanned image 216 using a graphical user interface 234 and select it for rescanning. Continuing, rescanning operation 217 may then be executed by configuring scanner 208 to capture higher-resolution data for the specified area, providing detailed imagery for further analysis. In some embodiments, initial scanning parameters used for scanning operation 212 may be used for rescanning operation 217. In an embodiment, without limitation, rescanning operation 217 may involve identifying discrepancies between an original scanned image and a target data model, such as missing tissue regions. In some embodiments, processor 202 may automatically adjust one or more rescanning parameters 218 of scanner 208, such as exposure or magnification, and perform rescanning to capture the corrected or missing information. Continuing the previous non-limiting example, a rescanning operation 217 may also involve capturing additional layers of a slide 214 when a depth-of-field issue is detected in the initial scan (scanned image 216). One or more rescanning parameters 218 of scanner 208 may modify a stack size or focus intervals to generate a layered or 3D representation of the slide 214. In some embodiments, processor 202 may generate GUI 234 including an indication that indicates whether scanned image 216 is rescanned or not. As a non-limiting example, indication may include text, image, icon, video, and the like. For example, and without limitation, a checkbox indicating scanned image 216 is rescanned or not may be checked.

Figure 3A:
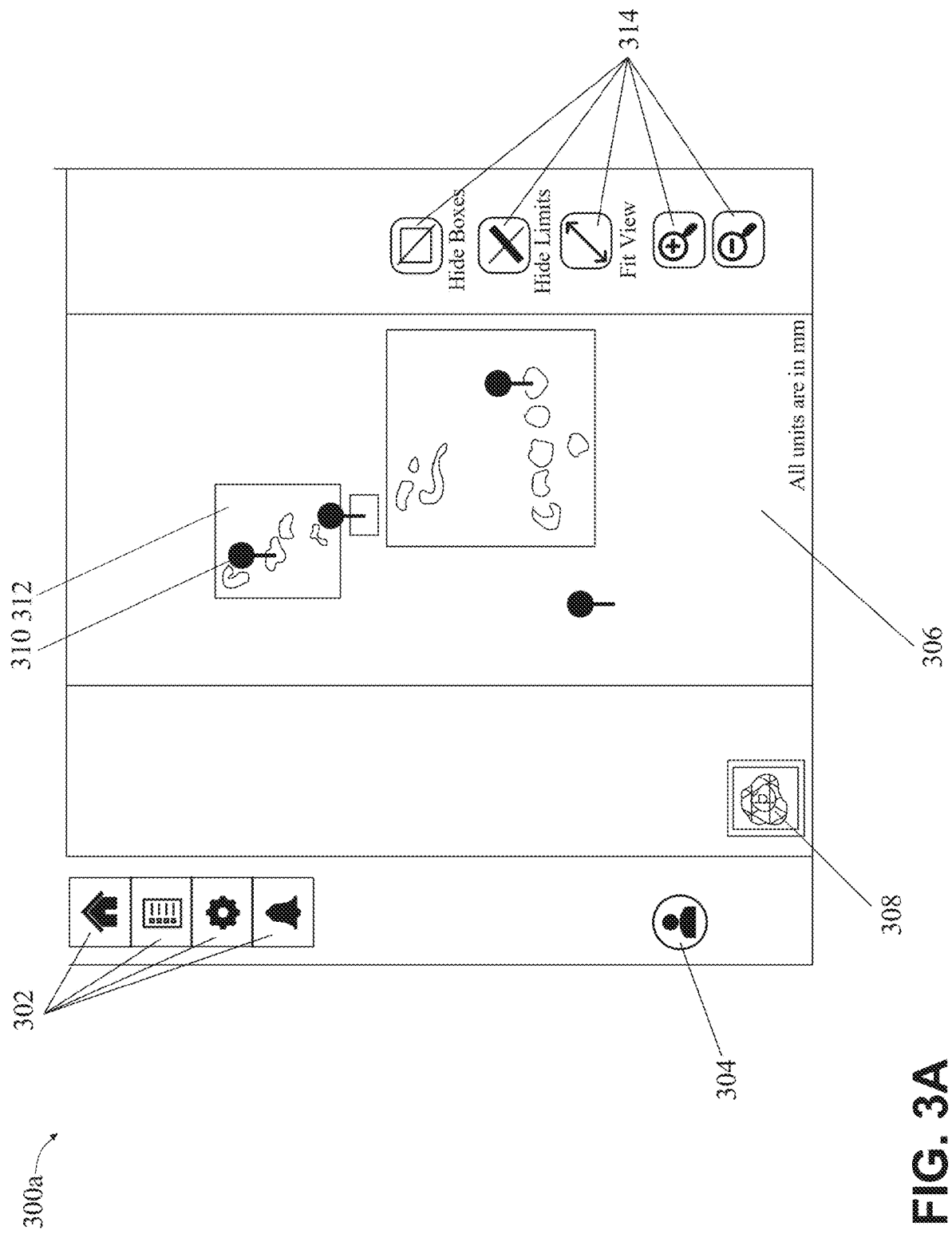
FIGS. 3A-B illustrate exemplary illustrations of a graphical user interface.
Figure 3B:
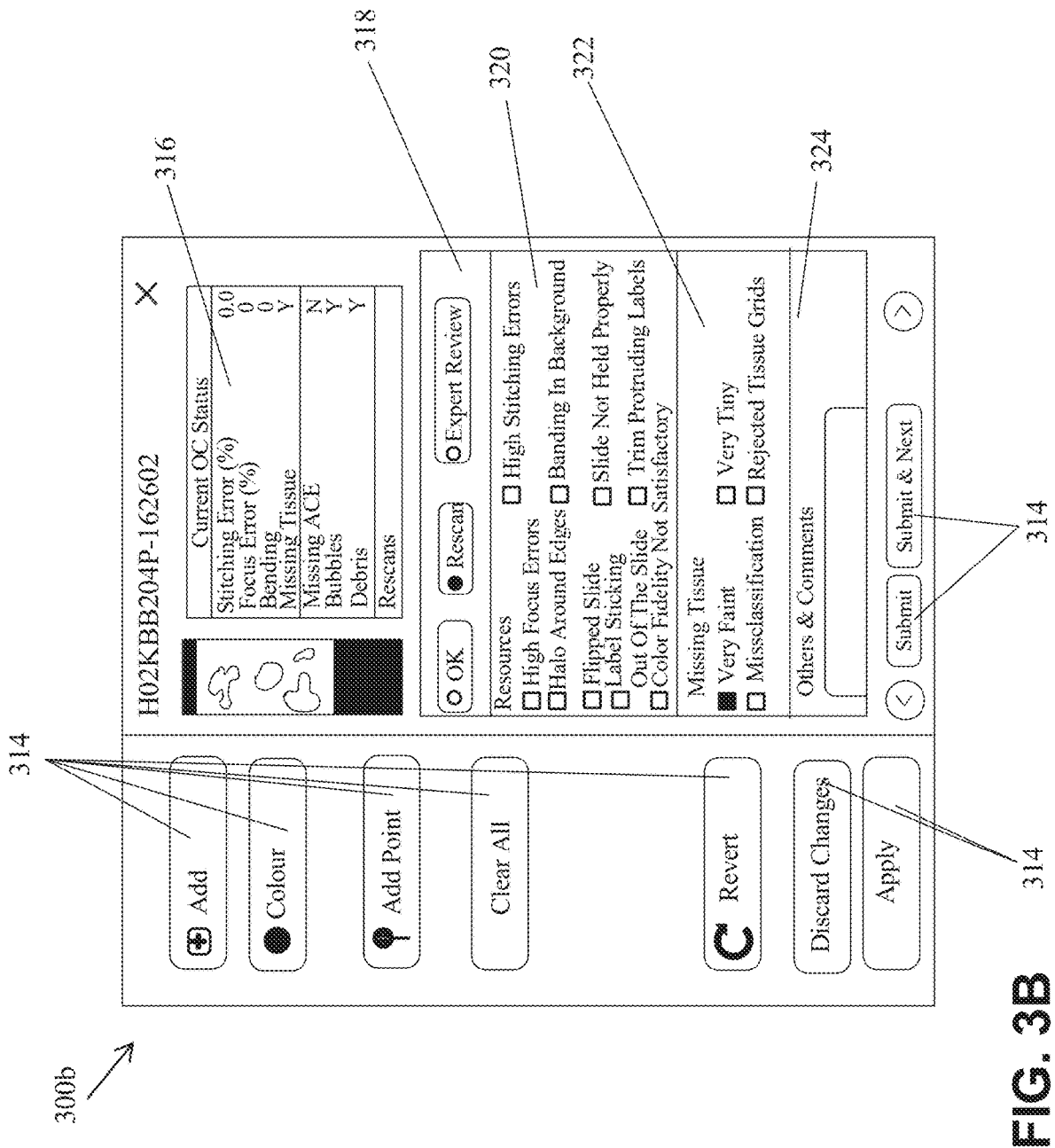

Referring now to FIG. 3A-B, exemplary illustrations 300*a-b* of a graphical user interface 234 are illustrated. In an embodiment, FIG. 3A may represent the left side of graphical user interface 234. In an embodiment, FIG. 3B may represent the right side of the graphical user interface 234. In an embodiment, illustrations 300*a-b* may include menu elements 302. As used in this disclosure, "menu elements" are graphical components within the graphical user interface that provide a list or grid of options, commands, or features, enabling users to navigate and interact with the system or perform specific actions. In an embodiment, illustration 300*a-b* may include a profile icon 304. As used in this disclosure, a "profile icon" is a graphical representation that identifies a user, group, or entity within the graphical user interface. In an embodiment, profile icon 304 may serve as an interactive element to access user-specific settings, preferences, or account-related features. In an embodiment, illustration 300*a-b* may include a first window 306. As used in this disclosure, a "first window" is a defined section or pane within the graphical user interface that displays specific content, data, or tools, providing a workspace or area for user interaction or visualization. In an embodiment, illustration 300*a-b* may include a corner visual 308. As used in this disclosure, a "corner visual" is a graphical element positioned in the corner of the graphical user interface, which may serve aesthetic, functional, or informational purposes. In an embodiment, the illustration 300*a-b* includes data visualization tools 310. As used in this disclosure, "data visualization tools" are features or components within the graphical user interface that transform raw data into graphical formats. In a non-limiting example, data visualization tools 310 may include charts, graphs, heatmaps, or overlays, enabling users to analyze and interpret information effectively. In an embodiment, illustration 300*a-b* may include a frame 312. In an embodiment, the frame may be a boundary or window within the graphical user interface that defines a specific area of interest, allowing users to isolate and interact with that region for detailed analysis, annotation, or rescanning. In an embodiment, the illustration 300*a-b* includes interactive elements 314. As used in this disclosure, "interactive elements" are graphical components within the graphical user interface. Interactive elements 314 may include as buttons, sliders, or icons, that respond to user actions, enabling interaction with the system to perform tasks or manipulate data. In an embodiment, interactive elements may include buttons labeled "Discard Changes," "Apply," and "Revert," which may enable users to manage modifications to the displayed slide data. Additionally, features such as "Add Point," "Color," and "Clear All" may allow for dynamic annotation and editing of visual elements on the slide. Other interactive elements 314 may include graphical elements such as limits or bounding boxes for identified areas may also be toggled using controls like "Hide Limits" and "Hide Boxes." In another embodiment, interactive elements 314 may feature tools such as "Fit View." In an embodiment, illustration 300a-b may include a current status window 316. As used in this disclosure, a "current status window" is a graphical section within the interface that displays real-time information or metrics related to the system's operations. In an embodiment, current status window 316 may include processing status, errors, or quality parameters. In an embodiment, illustration 300a-b may include an event selection window 318. As used in this disclosure, an "event selection window" is a section of the graphical user interface that allows users to choose, filter, or manage events, such as actions, notifications, or tasks, for further processing or visualization. In an embodiment, illustration 300a-b may include a resource menu 320. As used in this disclosure, a "resource menu" is a navigational component within the graphical user interface that provides access to system resources, tools, or settings, allowing users to manage configurations or access additional functionalities. In an embodiment, illustration 300a-b may include a missing tissue menu 322. As used in this disclosure, a "missing tissue menu" is a specific component of the graphical user interface that highlights or lists regions of a slide where tissue is absent, providing options for further action. Without limitation, missing tissue menu 322 may include functions for annotation or rescanning. In an embodiment, illustration 300a-b may include a text input window 324. As used in this disclosure, a "text input window" is a graphical section within the user interface that allows users to enter text-based information. In a non-limiting example, text input window 324 may permit the user to provide annotations, search queries, or commands, to interact with or modify the system's operations.

Figure 4:
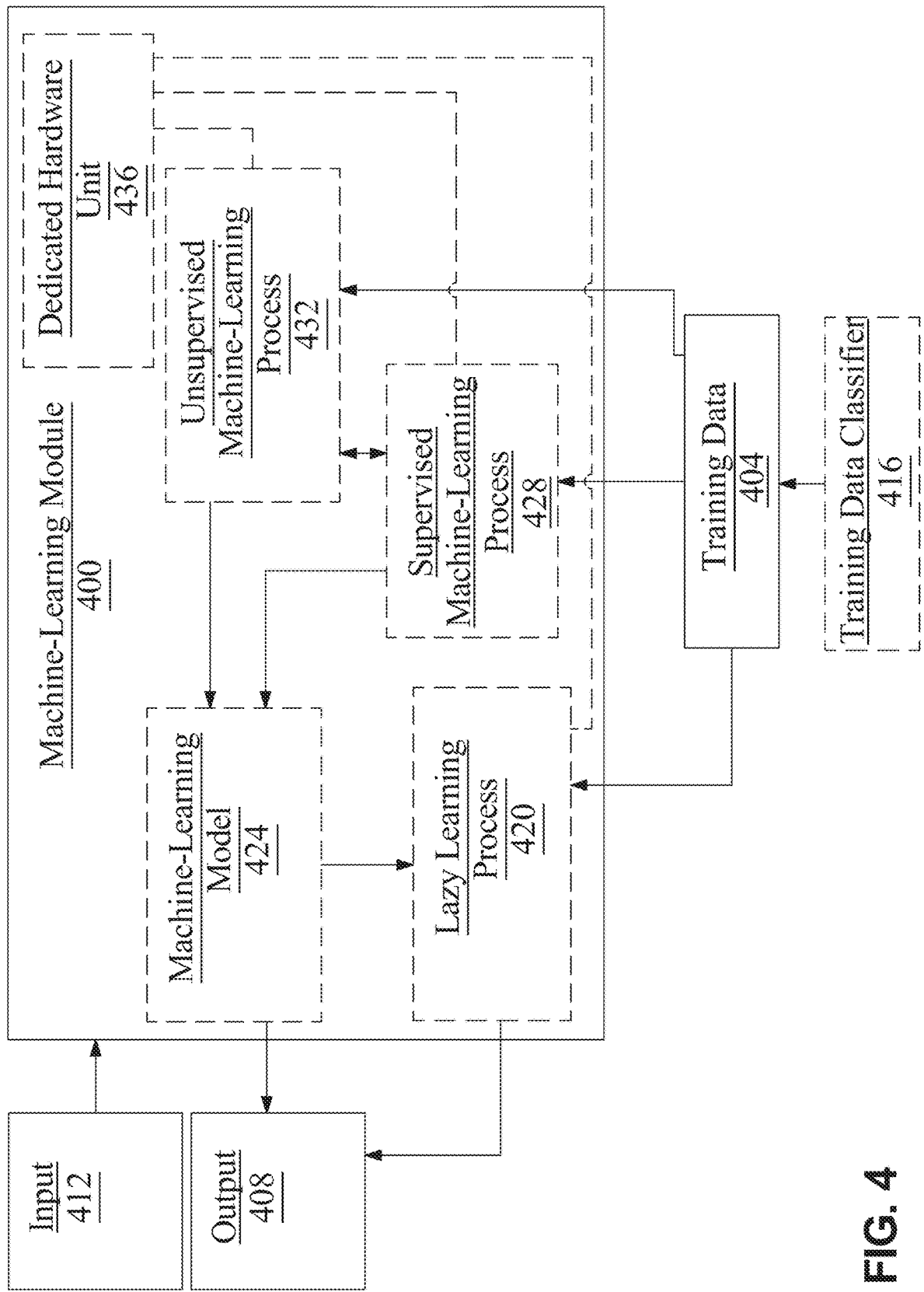
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include scanned image 216, quality metric 226, user input 220, quality threshold 232, ROI 236, and the like. As a nonlimiting illustrative example, output data may include quality metric 226, ROI 236, scanner command 250, quality error 230, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a specimen cohort related to a type of specimen, type of experiment, type of research, and the like.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 200 pixels, however a desired number of pixels may be 228. Processor may interpolate the low pixel count image to convert the 200 pixels into 228 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 356 pixels, however a desired number of pixels may be 228. Processor may down-sample the high pixel count image to convert the 356 pixels into 228 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include scanned image 216, quality metric 226, user input 220, quality threshold 232, ROI 236, and the like as described above as inputs, quality metric 226, ROI 236, scanner command 250, quality error 230, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
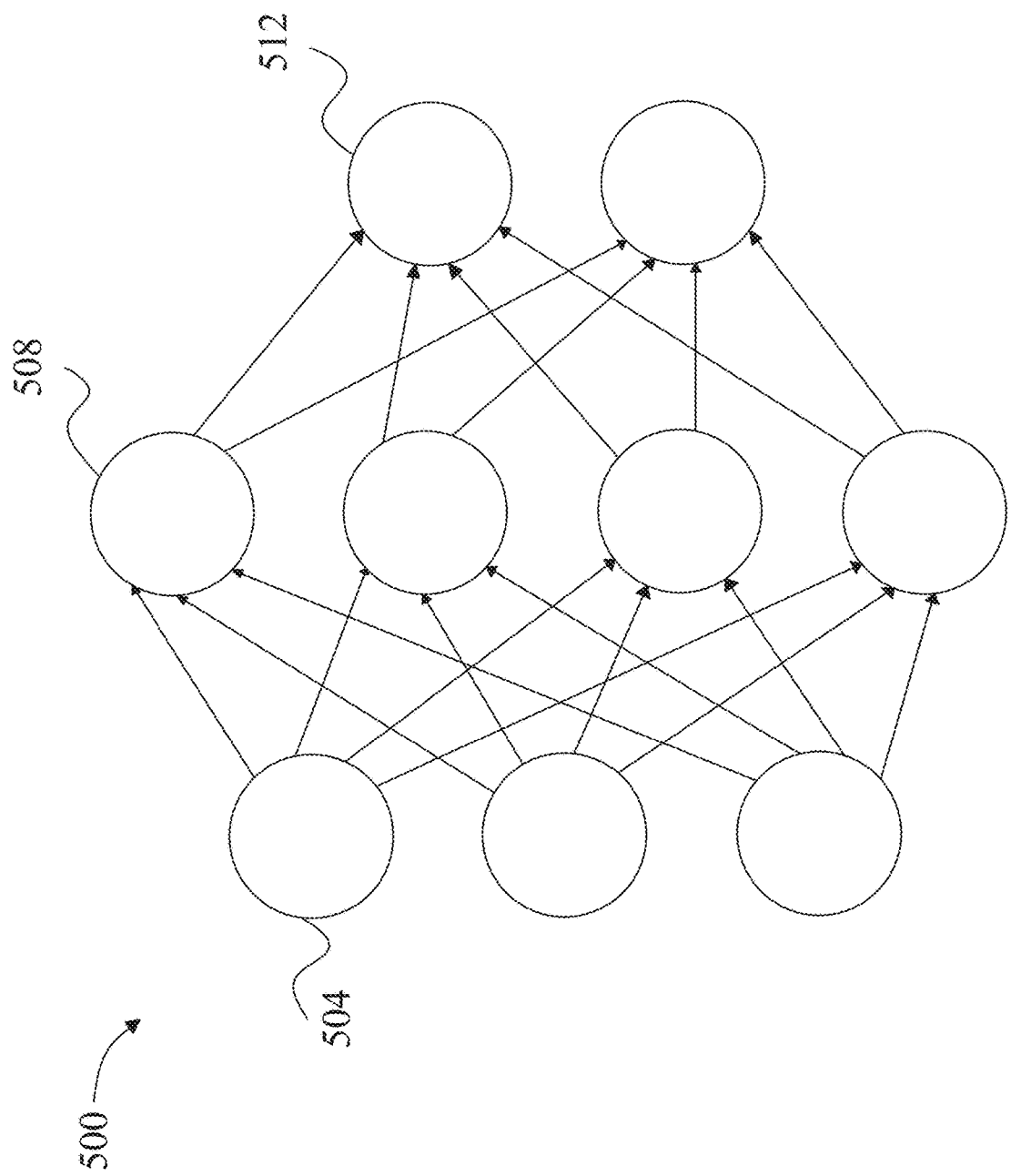
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
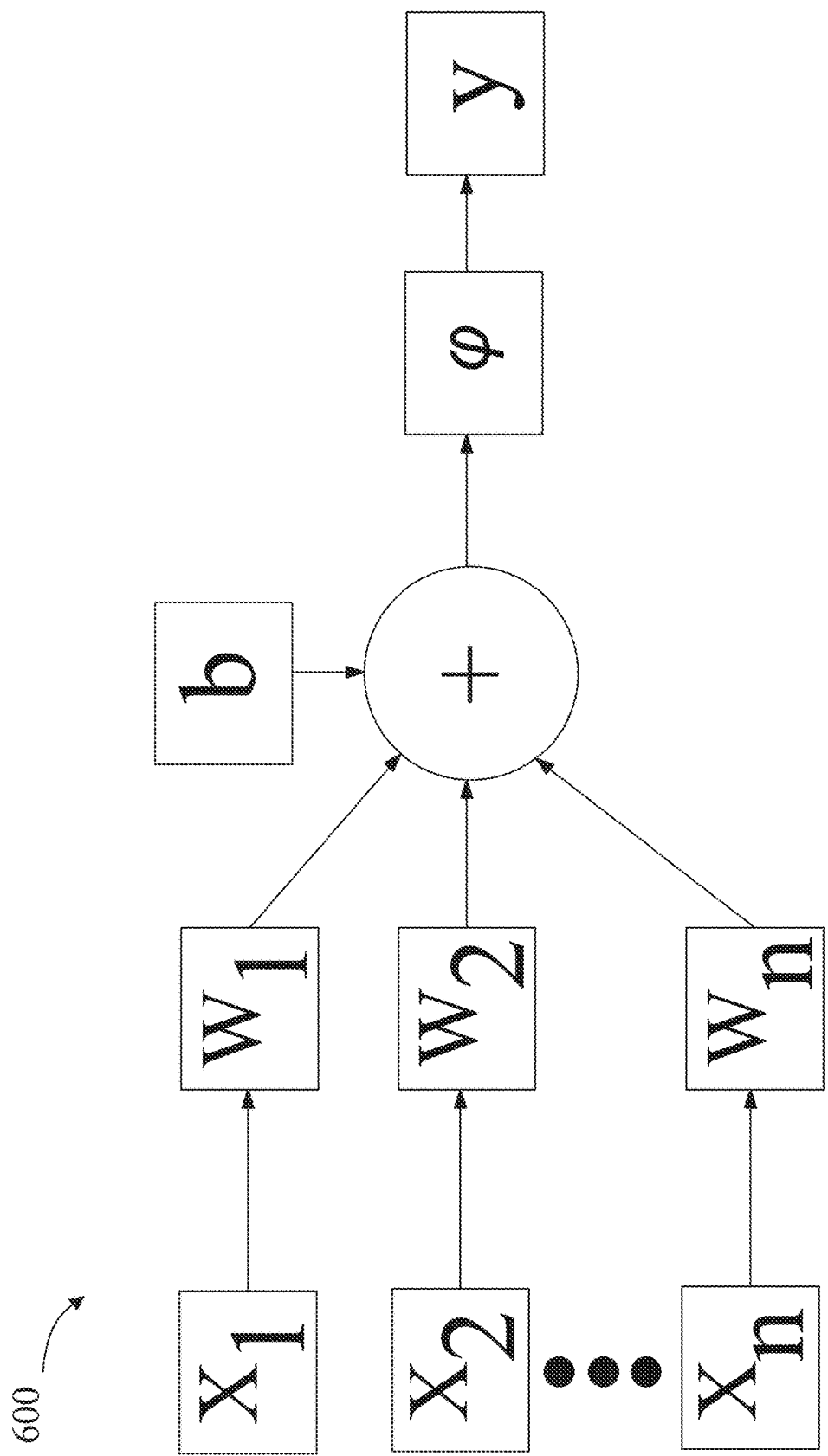
FIG. 6 illustrates a block diagram of an exemplary node in a neural network.

Referring now to FIG. 6 an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}(x + bx^r)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
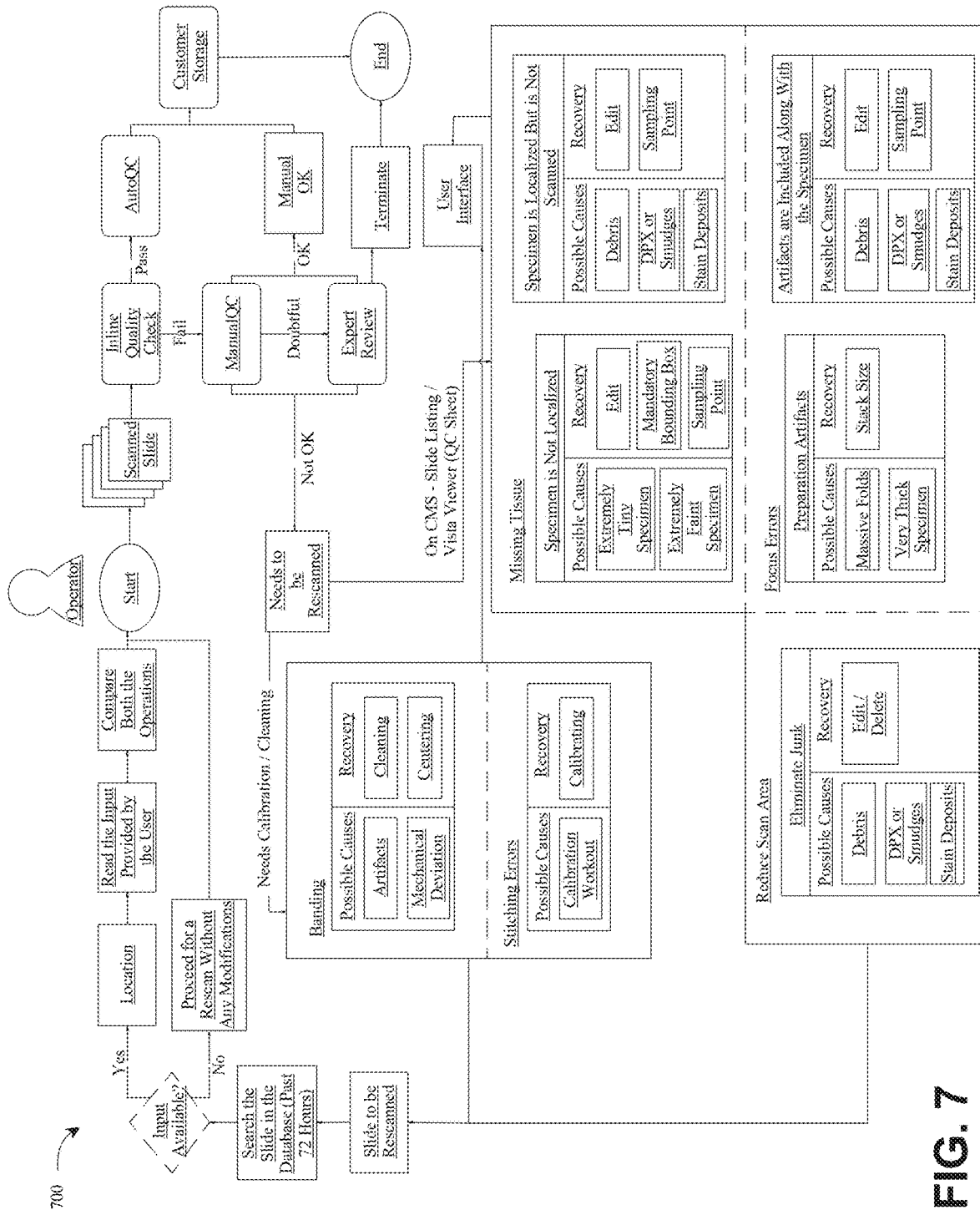
FIG. 7 illustrates a flow diagram of an exemplary apparatus for rescan workflow management in automated scanning systems.

Referring now to FIG. 7, a flow diagram of an exemplary apparatus 700 for rescan workflow management in automated scanning systems. Apparatus 700 disclosed herein may be consistent with apparatus 200 described with respect to FIG. 2. The flow diagram begins with the input of a scanned slide, where apparatus 700 can determine if the slide requires rescanning based on quality metrics or manual inspection. If rescanning is needed, apparatus 700 may evaluate the quality issues using parameters such as banding, missing tissue, stitching errors, focus errors, or excessive scan areas. Each error type may include possible causes and suggested recovery actions. For example, and without limitation, banding errors may arise from artifacts or optical misalignments and can be addressed by system cleaning or parameter adjustments. For example, and without limitation, missing tissue refers to portions of the specimen not being scanned, which may result from improper slide placement or hardware misalignment, with recovery steps involving re-mounting or equipment recalibration. For example, and without limitation, stitching errors, caused by misaligned image segments, may require calibration or re-optimization of stitching software. For example, and without limitation, focus errors, potentially caused by preparation artifacts or system miscalibration, can be corrected by rechecking slide preparation or focusing algorithms. For example, and without limitation, excessive scan areas, where unnecessary regions of the slide are scanned, can be optimized by reducing bounding boxes and excluding irrelevant areas. In some embodiments, each quality error may be visually represented with specific icons, causes, and recovery suggestions. In some embodiments, user or operator may adjust the visual elements. In a non-limiting example, apparatus 700 may include a user interface for manual input and error localization, allowing operators to mark regions of interest and apply corrections interactively. The workflow may include quality validation, either automatically or through a manual check before the final scanned image is stored or released to the customer.

Figure 8:
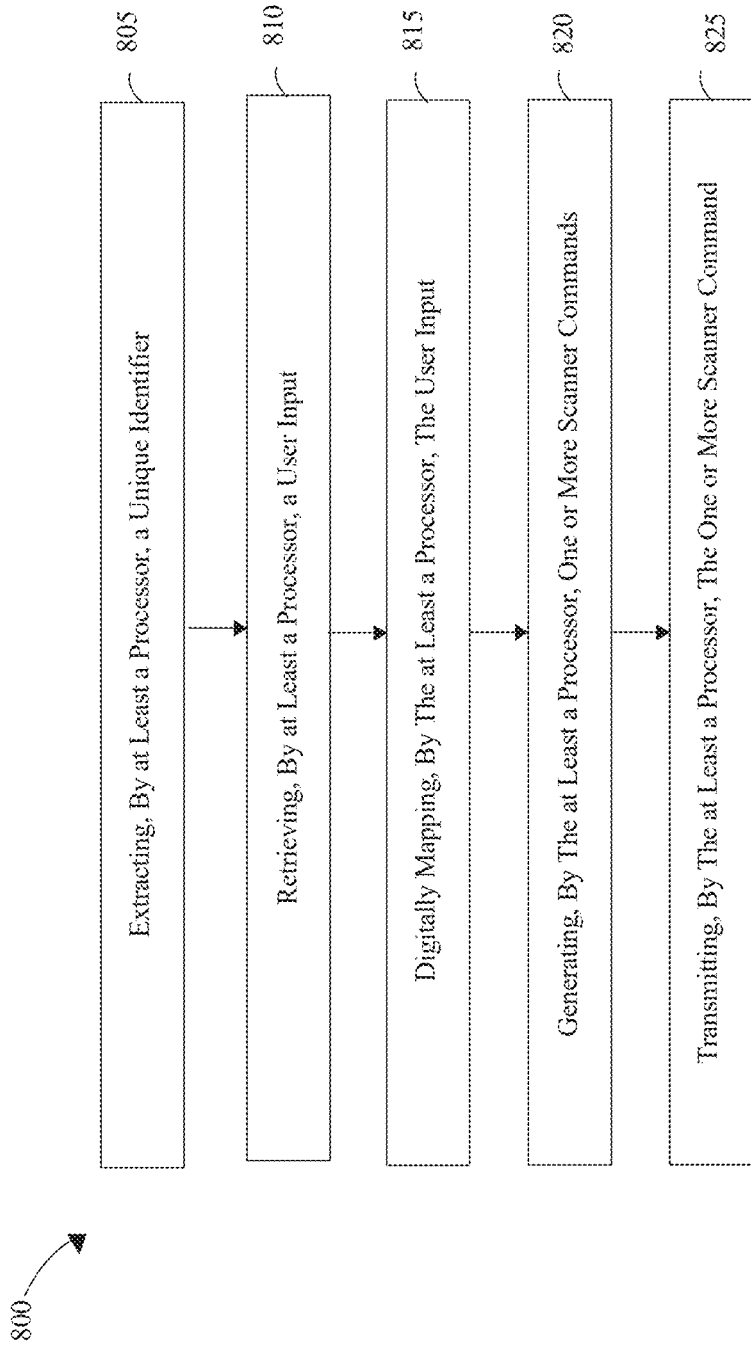
FIG. 8 illustrates a flow diagram of an exemplary method for rescan workflow management in automated scanning systems.

Referring now to FIG. 8, a flow diagram of an exemplary method 800 for feedback utilization in automated scanning system is described. At step 805, method 800 includes extracting, by at least a processor, a unique identifier from a slide label located on at least a slide. This may be implemented with reference to FIGS. 1-7 and without limitation.

With continued reference to FIG. 8, at step 810 method 800 includes retrieving, by at least a processor, a user input associated with the at least a slide from a database as a function of the unique identifier, wherein the user input comprises one or more corrective actions. This may be implemented with reference to FIGS. 1-7 and without limitation.

With continued reference to FIG. 8, at step 815 method 800 includes digitally mapping, by the at least a processor, the user input to at least a corresponding region on the at least a slide, wherein digital mapping the user input to the at least a corresponding region on the at least a slide comprises receiving an initial scanned image of the at least a slide, identifying an initial orientation of the initial scanned image, identifying a subsequent orientation of the at least a slide, transforming the user input as a function of the initial orientation and the subsequent orientation to generate a transformed user input and mapping the transformed user input to the at least a corresponding region on the at least a slide. In one or more embodiments, identifying the initial orientation of the initial scanned image comprises identifying a first bounding region within the initial scanned image; and localizing the user input relative to the first bounding region, identifying the subsequent orientation of the at least a slide comprises identifying a second bounding region of the at least a slide and mapping the transformed user input to the at least a corresponding region on the at least a slide comprises localizing the user input relative to the second bounding region. In one or more embodiments, transforming the user input as a function of the initial orientation and the subsequent orientation to generate a transformed user input comprises performing a matrix transformation on the user input as a function of the initial orientation and the subsequent orientation. This may be implemented with reference to FIGS. 1-7 and without limitation.

With continued reference to FIG. 8, at step 820 method 800 includes generating, by the at least a processor, one or more scanner commands as a function of the transformed user input wherein the one or more scanner commands is configured to command the scanning system to prioritize the transformed user input when rescanning the at least a slide. This may be implemented with reference to FIGS. 1-7 and without limitation.

With continued reference to FIG. 8, at step 825 method 800 includes transmitting, by the at least a processor, the scanner command to a scanning system to generate at least a re-scanned image of the at least a slide. In one or more embodiments, the initial scanned image of the at least a slide comprises a previously captured image of the at least a slide and wherein the initial scanned image is received from the database. In one or more embodiments, identifying, by the at least a processor, the initial orientation of the initial scanned image comprises identifying the slide label within the initial scanned image and identifying an orientation of the slide label within the initial scanned image. In one or more embodiments, transforming the user input as a function of the initial orientation and the subsequent orientation to generate a transformed user input comprises performing a matrix transformation on the user input as a function of the initial orientation and the subsequent orientation. In one or more embodiments, transforming the user input includes performing a matrix transformation on the initial position as a function of the initial orientation and the subsequent orientation to identify the subsequent position. In one or more embodiments, the user input comprises a bounding box, and wherein the bounding box is configured to focus the at least a scanner to an area defined by the bounding box. In one or more embodiments, the initial scanned image of the at least a slide is scanned using a differing scanning system. In one or more embodiments, the user input comprises a corrective action associated with the initial scanned image. In one or more embodiments, the one or more scanner commands is configured to command the scanning system to prioritize the transformed user input in comparison to a plurality of predetermined scanner commands when rescanning the at least a slide. In one or more embodiments, the one or more corrective actions comprises correction of a focus error. This may be implemented with reference to FIGS. 1-7 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
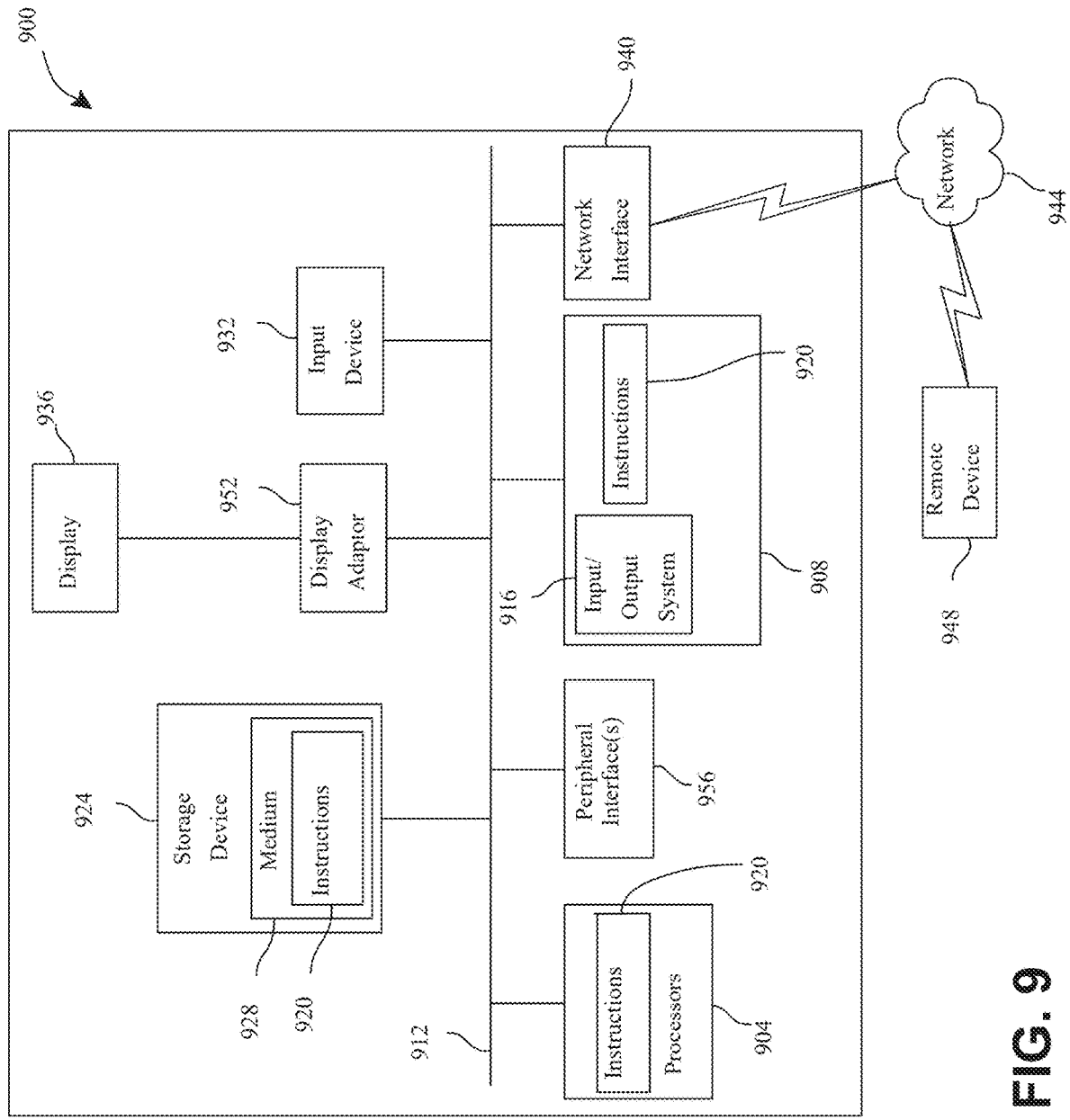
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 2494 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for feedback utilization in automated scanning systems, the apparatus comprising:
   a scanning system, wherein the scanning system is configured to initiate a rescanning operation for at least a slide comprising a slide label to generate at least a re-scanned image;
   at least a processor; and
   a memory communicatively connected to the at least a processor, wherein the memory contains instructions configuring the at least a processor to:
      extract a unique identifier from the slide label located on the at least a slide;
      retrieve a user input associated with the at least a slide from a database as a function of the unique identifier, wherein the user input comprises one or more corrective actions;
      digitally map the user input to at least a corresponding region on the at least a slide, wherein digital mapping the user input to the at least a corresponding region on the at least a slide comprises:
         receiving an initial scanned image of the at least a slide;

identifying an initial orientation of the initial scanned image;
identifying a subsequent orientation of the at least a slide;
transforming the user input as a function of the initial orientation and the subsequent orientation to generate a transformed user input,
wherein transforming the user input comprises:
identifying an initial position of the user input on the initial scanned image; and
identifying a subsequent position of the user input on the slide as a function of the initial position, wherein the transformed user input comprises the subsequent position of user input; and
mapping the transformed user input to the at least a corresponding region on the at least a slide;
generate at least a scanner command as a function of the transformed user input wherein the at least a scanner command is configured to command the scanning system to prioritize the transformed user input when rescanning the at least a slide; and
transmit the at least a scanner command to the scanning system to generate the at least a re-scanned image.

2. The apparatus of claim 1, wherein the initial scanned image is received from the database.

3. The apparatus of claim 1, wherein identifying the initial orientation of the initial scanned image comprises:
identifying the slide label within the initial scanned image; and
identifying an orientation of the slide label within the initial scanned image.

4. The apparatus of claim 1, transforming the user input further comprises performing a matrix transformation on the initial position as a function of the initial orientation and the subsequent orientation to identify the subsequent position.

5. The apparatus of claim 1, wherein the user input comprises a bounding box, and wherein the bounding box is configured to focus the at least a scanner to an area defined by the bounding box.

6. The apparatus of claim 1, wherein the initial scanned image of the at least a slide is scanned using a differing scanning system.

7. The apparatus of claim 1, wherein the user input comprises a corrective action associated with the initial scanned image.

8. The apparatus of claim 1, wherein:
identifying the initial orientation of the initial scanned image comprises:
identifying a first bounding region within the initial scanned image; and
localizing the user input relative to the first bounding region;
identifying the subsequent orientation of the at least a slide comprises identifying a second bounding region of the at least a slide; and
mapping the transformed user input to the at least a corresponding region on the at least a slide comprises localizing the user input relative to the second bounding region.

9. The apparatus of claim 1, wherein the at least a scanner command is configured to command the scanning system to prioritize the transformed user input in comparison to a plurality of predetermined scanner commands when rescanning the at least a slide.

10. The apparatus of claim 1, wherein the one or more corrective actions comprises correction of a focus error.

11. A method for feedback utilization in automated scanning systems, the method comprising:
extracting, by at least a processor, a unique identifier from a slide label located on at least a slide;
retrieving, by at least a processor, a user input associated with the at least a slide from a database as a function of the unique identifier, wherein the user input comprises one or more corrective actions;
digitally mapping, by the at least a processor, the user input to at least a corresponding region on the at least a slide, wherein digital mapping the user input to the at least a corresponding region on the at least a slide comprises:
receiving an initial scanned image of the at least a slide;
identifying an initial orientation of the initial scanned image;
identifying a subsequent orientation of the at least a slide;
transforming the user input as a function of the initial orientation and the subsequent orientation to generate a transformed user input, wherein transforming the user input comprises:
identifying an initial position of the user input on the initial scanned image; and
identifying a subsequent position of the user input on the slide as a function of the initial position, wherein the transformed user input comprises the subsequent position of user input; and
mapping the transformed user input to the at least a corresponding region on the at least a slide;
generating, by the at least a processor, at least a scanner command as a function of the transformed user input wherein the at least a scanner command is configured to command the scanning system to prioritize the transformed user input when rescanning the at least a slide; and
transmitting, by the at least a processor, the at least a scanner command to a scanning system to generate at least a re-scanned image of the at least a slide.

12. The method of claim 11, wherein the initial scanned image is received from the database.

13. The method of claim 11, wherein identifying, by the at least a processor, the initial orientation of the initial scanned image comprises:
identifying the slide label within the initial scanned image; and
identifying an orientation of the slide label within the initial scanned image.

14. The method of claim 11, transforming the user input further comprises performing a matrix transformation on the initial position as a function of the initial orientation and the subsequent orientation to identify the subsequent position.

15. The method of claim 11, wherein the user input comprises a bounding box, and wherein the bounding box is configured to focus the at least a scanner to an area defined by the bounding box.

16. The method of claim 11, wherein the initial scanned image of the at least a slide is scanned using a differing scanning system.

17. The method of claim 11, wherein the user input comprises a corrective action associated with the initial scanned image.

18. The method of claim 11, wherein:
identifying the initial orientation of the initial scanned image comprises:
identifying a first bounding region within the initial scanned image; and localizing the user input relative to the first bounding region;

identifying the subsequent orientation of the at least a slide comprises identifying a second bounding region of the at least a slide; and mapping the transformed user input to the at least a corresponding region on the at least a slide comprises localizing the user input relative to the second bounding region.

19. The method of claim 11, wherein the at least a scanner command is configured to command the scanning system to prioritize the transformed user input in comparison to a plurality of predetermined scanner commands when rescanning the at least a slide.

20. The method of claim 11, wherein the one or more corrective actions comprises correction of a focus error.

\* \* \* \* \*